US012069543B2

(12) United States Patent
Toner et al.

(10) Patent No.: US 12,069,543 B2
(45) Date of Patent: Aug. 20, 2024

(54) GENERATING THIRD-PARTY NOTIFICATIONS RELATED TO OCCURRENCE OF MOTION EVENTS

(71) Applicant: Cognitive Systems Corp., Waterloo (CA)

(72) Inventors: Benedict Toner, Alresford (GB); Christian Anthony Schaefer, Waterloo (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

(21) Appl. No.: 18/059,290

(22) Filed: Nov. 28, 2022

(65) Prior Publication Data

US 2023/0171326 A1 Jun. 1, 2023

Related U.S. Application Data

(60) Provisional application No. 63/283,708, filed on Nov. 29, 2021.

(51) Int. Cl.
*H04W 4/029* (2018.01)
*H04L 67/50* (2022.01)
(Continued)

(52) U.S. Cl.
CPC ............ *H04W 4/029* (2018.02); *H04L 67/53* (2022.05); *H04L 67/535* (2022.05); *H04W 84/12* (2013.01)

(58) Field of Classification Search
None
See application file for complete search history.

(56) References Cited

U.S. PATENT DOCUMENTS 8,710,984 B2 4/2014 Wilson et al.
9,523,760 B1 12/2016 Kravets et al.
(Continued)

FOREIGN PATENT DOCUMENTS

CA 3079998 6/2019
CA 3092886 10/2019
(Continued)

OTHER PUBLICATIONS

Ma , et al., "WiFi Sensing with Channel State Information: A Survey", ACM Comput. Surv., vol. 52, No. 3, Article 46, Jun. 2019, 36 pgs.

(Continued)

*Primary Examiner* — James A Edwards
(74) *Attorney, Agent, or Firm* — Henry Patent Law Firm PLLC

(57) ABSTRACT

A method includes receiving, at a cloud-based computer system, motion data from a remote motion detection system configured to detect motion in a space. The motion data is derived from wireless signals communicated through the space by the wireless communication devices. A motion classifier is applied to the motion data by the cloud-based computer system to detect an occurrence of a first predefined motion event in the space. A subset of the third party entities that have registered for notifications associated with the first predefined motion event is identified based on reference to a database. Notifications are generated addressed to the subset of the third party entities. Each notification includes an indication that the first predefined motion event was detected and additional information describing the occurrence of the first predefined motion event. The notifications are then sent to the subset of the third party entities.

27 Claims, 17 Drawing Sheets

(51) Int. Cl.
*H04L 67/53* (2022.01)
*H04W 84/12* (2009.01)

(56) References Cited

U.S. PATENT DOCUMENTS

| | | | |
|---|---|---|---|
| 9,524,628 | B1 | 12/2016 | Omer et al. |
| 9,584,974 | B1 | 2/2017 | Omer et al. |
| 9,869,759 | B2 | 1/2018 | Furuskog et al. |
| 9,927,519 | B1 | 3/2018 | Omer et al. |
| 10,004,076 | B1 | 6/2018 | Griesdorf et al. |
| 10,048,350 | B1 | 8/2018 | Piao et al. |
| 10,051,414 | B1 | 8/2018 | Omer et al. |
| 10,108,903 | B1 | 10/2018 | Piao et al. |
| 10,109,167 | B1 | 10/2018 | Olekas et al. |
| 10,109,168 | B1 | 10/2018 | Devison et al. |
| 10,111,228 | B2 | 10/2018 | Griesdorf et al. |
| 10,129,853 | B2 | 11/2018 | Manku et al. |
| 10,228,439 | B1 | 3/2019 | Olekas et al. |
| 10,264,405 | B1 | 4/2019 | Manku et al. |
| 10,318,890 | B1* | 6/2019 | Kravets .......... G01S 7/415 |
| 10,380,856 | B2 | 8/2019 | Devison et al. |
| 10,393,866 | B1 | 8/2019 | Kravets et al. |
| 10,404,387 | B1 | 9/2019 | Devison et al. |
| 10,438,468 | B2 | 10/2019 | Olekas et al. |
| 10,459,074 | B1 | 10/2019 | Omer et al. |
| 10,459,076 | B2 | 10/2019 | Kravets et al. |
| 10,460,581 | B1 | 10/2019 | Devison et al. |
| 10,498,467 | B1 | 12/2019 | Ravkine |
| 10,499,364 | B1 | 12/2019 | Ravkine |
| 10,506,384 | B1 | 12/2019 | Omer et al. |
| 10,565,860 | B1 | 2/2020 | Omer et al. |
| 10,567,914 | B1 | 2/2020 | Omer et al. |
| 10,600,314 | B1* | 3/2020 | Manku .......... G08B 29/185 |
| 10,605,907 | B2 | 3/2020 | Kravets et al. |
| 10,605,908 | B2 | 3/2020 | Kravets et al. |
| 10,743,143 | B1 | 8/2020 | Devison et al. |
| 10,798,529 | B1 | 10/2020 | Beg et al. |
| 10,849,006 | B1 | 11/2020 | Beg et al. |
| 11,006,245 | B2 | 5/2021 | Omer |
| 11,012,122 | B1 | 5/2021 | Beg et al. |
| 11,018,734 | B1 | 5/2021 | Beg |
| 11,070,399 | B1 | 7/2021 | Omer et al. |
| 11,087,604 | B2 | 8/2021 | Beg et al. |
| 2012/0146788 | A1 | 6/2012 | Wilson et al. |
| 2014/0247179 | A1 | 9/2014 | Furuskog |
| 2015/0154850 | A1* | 6/2015 | Fadell .......... G06Q 10/083 340/501 |
| 2017/0359804 | A1 | 12/2017 | Manku et al. |
| 2018/0270821 | A1 | 9/2018 | Griesdorf et al. |
| 2019/0051128 | A1* | 2/2019 | Yamashiro .......... G07C 9/257 |
| 2019/0122514 | A1 | 4/2019 | Olekas et al. |
| 2019/0146075 | A1 | 5/2019 | Kravets et al. |
| 2019/0146076 | A1 | 5/2019 | Kravets et al. |
| 2019/0146077 | A1 | 5/2019 | Kravets et al. |
| 2019/0147713 | A1 | 5/2019 | Devison et al. |
| 2019/0170869 | A1 | 6/2019 | Kravets et al. |
| 2019/0384409 | A1 | 12/2019 | Omer et al. |
| 2020/0175405 | A1 | 6/2020 | Omer et al. |
| 2020/0178033 | A1 | 6/2020 | Omer et al. |
| 2020/0264292 | A1 | 8/2020 | Kravets et al. |
| 2020/0327430 | A1 | 10/2020 | Martinez et al. |
| 2020/0351576 | A1 | 11/2020 | Beg et al. |
| 2020/0351692 | A1 | 11/2020 | Beg et al. |
| 2020/0359248 | A1 | 11/2020 | Sadeghi et al. |
| 2021/0319673 | A1* | 10/2021 | Amini .......... H04W 88/18 |
| 2022/0070710 | A1 | 3/2022 | Lim et al. |
| 2023/0171563 | A1 | 6/2023 | Toner et al. |

FOREIGN PATENT DOCUMENTS

| | | |
|---|---|---|
| CN | 111027692 | 4/2020 |
| WO | 2015168700 | 11/2015 |
| WO | 2017106976 | 6/2017 |
| WO | 2017132765 | 8/2017 |
| WO | 2017210770 | 12/2017 |
| WO | 2018094502 | 5/2018 |

OTHER PUBLICATIONS

Zhang, et al., "Enabling Joint Communication and Radar Sensing in Mobile Networks—A Survey", arXiv:2006.07559v3, Jan. 16, 2021, 32 pgs.

WIPO, International Search Report and Written Opinion mailed Mar. 7, 2023, in PCT/CA2022/051739, 9 pgs.

* cited by examiner

Motion Pattern Detection Function Example:
- Spatial path starting at point A, ending at point B, following a route defined by curve C
- Spatial range +/- 1m along all points of the curve
- Temporal range between 9:00 AM and 9:30 AM on Weekdays

GENERATING THIRD-PARTY NOTIFICATIONS RELATED TO OCCURRENCE OF MOTION EVENTS

CROSS-REFERENCE TO RELATED APPLICATIONS

This application claims priority to, and incorporates by reference the entire disclosure of U.S. Provisional Patent Application No. 63/283,708, filed on Nov. 29, 2021.

BACKGROUND

The following description relates to context-dependent processing and encoding of motion data from a wireless communication network.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems.

DETAILED DESCRIPTION

Figure 1:
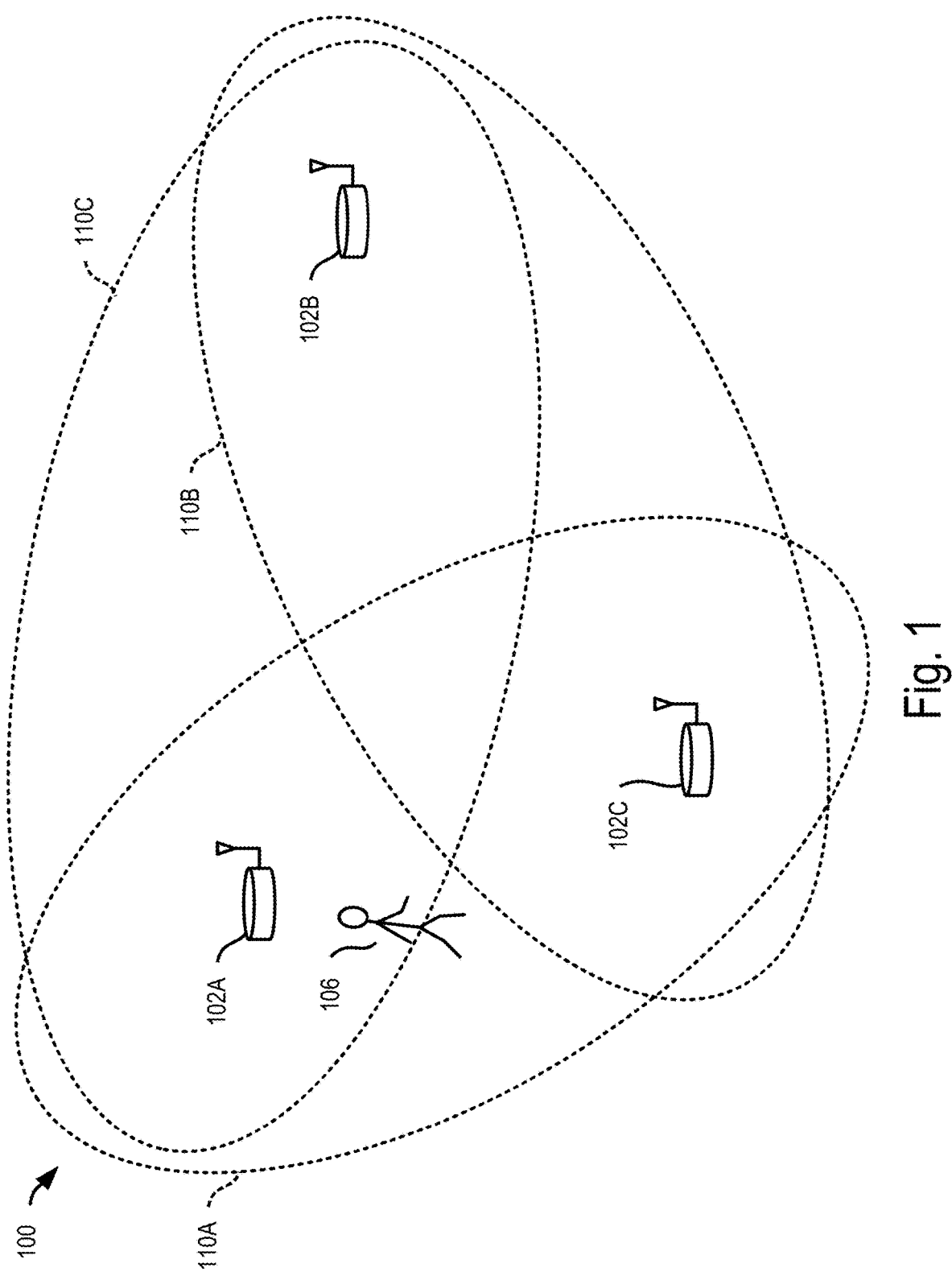
FIG. 1 is a diagram showing an example wireless communication system.

In some aspects of what is described here, a wireless sensing system can process wireless signals (e.g., radio frequency signals) transmitted through a space between wireless communication devices for wireless sensing applications. Example wireless sensing applications include detecting motion, which can include one or more of the following: detecting motion of objects in the space, motion tracking, localization of motion in a space, breathing detection, breathing monitoring, presence detection, gesture detection, gesture recognition, human detection (e.g., moving and stationary human detection), human tracking, fall detection, speed estimation, intrusion detection, walking detection, step counting, respiration rate detection, sleep pattern detection, sleep quality monitoring, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, metal detection, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals.

The examples described herein may be useful for home monitoring. In some instances, home monitoring using the wireless sensing systems described herein may provide several advantages, including full home coverage through walls and in darkness, discreet detection without cameras, higher accuracy and reduced false alerts (e.g., in comparison with sensors that do not use Wi-Fi signals to sense their environments), and adjustable sensitivity. By layering Wi-Fi motion detection capabilities into routers and gateways, a robust motion detection system may be provided.

The examples described herein may also be useful for wellness monitoring. Caregivers want to know their loved ones are safe, while seniors and people with special needs want to maintain their independence at home with dignity. In some instances, wellness monitoring using the wireless sensing systems described herein may provide a solution that uses wireless signals to detect motion without using cameras or infringing on privacy, generates alerts when unusual activity is detected, tracks sleep patterns, and generates preventative health data. For example, caregivers can monitor motion, visits from health care professionals, and unusual behavior such as staying in bed longer than normal. Furthermore, motion is monitored unobtrusively without the need for wearable devices, and the wireless sensing systems described herein offer a more affordable and convenient alternative to assisted living facilities and other security and health monitoring tools.

The examples described herein may also be useful for setting up a smart home. In some examples, the wireless sensing systems described herein use predictive analytics and artificial intelligence (AI), to learn motion patterns and trigger smart home functions accordingly. Examples of smart home functions that may be triggered include adjusting the thermostat when a person walks through the front door, turning other smart devices on or off based on preferences, automatically adjusting lighting, adjusting HVAC systems based on present occupants, etc.

In some aspects of what is described here, motion information can be generated once and distributed to various information consumers rather than the duplicative effort of each consumer having to generate their own motion information. Additionally, motion information can be partitioned as allowing it to be processed on different equipment tiers possessing different amounts of computing power. For example, motion information can be processed in the cloud on powerful server farms rather than being restricted to low-power on-premises devices. Furthermore, the motion information can be condensed into motion signatures that allow complex combinations of spatial and time information to be more easily used within a motion environment and more efficiently transferred between equipment tiers.

In some instances, aspects of the systems and techniques described here provide technical improvements and advantages over existing approaches. For example, collecting motion data once and distributing it to multiple consumers reduces the computational burden of duplicative processing for each of a multitude of recipients. Sending only necessary data to an information consumer also reduces redundant network traffic resulting in more efficient use of home, public, and other networks. The technical improvements and advantages achieved in examples where the wireless sensing system is used for motion detection may also be achieved in other examples where the wireless sensing system is used for other wireless sensing applications.

In some instances, a wireless sensing system can be implemented using a wireless communication network. Wireless signals received at one or more wireless communication devices in the wireless communication network may be analyzed to determine channel information for the different communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed by one or more motion detection algorithms (e.g., running on a hub device, a client device, or other device in the wireless communication network, or on a remote device communicably coupled to the network) to detect, for example, whether motion has occurred in the space, to determine a relative location of the detected motion, or both. In some aspects, the channel information for each of the communication links may be analyzed to detect whether an object is present or absent, e.g., when no motion is detected in the space.

In some instances, a motion detection system returns motion data, and the motion data can be processed, for example, to perform motion encoding or to provide motion context alerts and notifications. In some implementations, motion data is a result that is indicative of a degree of motion in the space, the location of motion in the space, a time at which the motion occurred, or a combination thereof. In some instances, the motion data can include a motion score, which may include, or may be, one or more of the following: a scalar quantity indicative of a level of signal perturbation in the environment accessed by the wireless signals; an indication of whether there is motion; an indication of whether there is an object present; or an indication or classification of a gesture performed in the environment accessed by the wireless signals.

In some implementations, the motion detection system can be implemented using one or more motion detection algorithms. Example motion detection algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," U.S. Pat. No. 10,743,143 entitled "Determining a Motion Zone for a Location of Motion Detected by Wireless Signals," U.S. Pat. No. 10,605,908 entitled "Motion Detection Based on Beamforming Dynamic Information from Wireless Standard Client Devices," U.S. Pat. No. 10,605,907 entitled "Motion Detection by a Central Controller Using Beamforming Dynamic Information," U.S. Pat. No. 10,600,314 entitled "Modifying Sensitivity Settings in a Motion Detection System," U.S. Pat. No. 10,567,914 entitled "Initializing Probability Vectors for Determining a Location of Motion Detected from Wireless Signals," U.S. Pat. No. 10,565,860 entitled "Offline Tuning System for Detecting New Motion Zones in a Motion Detection System," U.S. Pat. No. 10,506,384 entitled "Determining a Location of Motion Detected from Wireless Signals Based on Prior Probability," U.S. Pat. No. 10,499,364 entitled "Identifying Static Leaf Nodes in a Motion Detection System," U.S. Pat. No. 10,498,467 entitled "Classifying Static Leaf Nodes in a Motion Detection System," U.S. Pat. No. 10,460,581 entitled "Determining a Confidence for a Motion Zone Identified as a Location of Motion for Motion Detected by Wireless Signals," U.S. Pat. No. 10,459,076 entitled "Motion Detection based on Beamforming Dynamic Information," U.S. Pat. No. 10,459,074 entitled "Determining a Location of Motion Detected from Wireless Signals Based on Wireless Link Counting," U.S. Pat. No. 10,438,468 entitled "Motion Localization in a Wireless Mesh Network Based on Motion Indicator Values," U.S. Pat. No. 10,404,387 entitled "Determining Motion Zones in a Space Traversed by Wireless Signals," U.S. Pat. No. 10,393,866 entitled "Detecting Presence Based on Wireless Signal Analysis," U.S. Pat. No. 10,380,856 entitled "Motion Localization Based on Channel Response Characteristics," U.S. Pat. No. 10,318,890 entitled "Training Data for a Motion Detection System using Data from a Sensor Device," U.S. Pat. No. 10,264,405 entitled "Motion Detection in Mesh Networks," U.S. Pat. No. 10,228,439 entitled "Motion Detection Based on Filtered Statistical Parameters of Wireless Signals," U.S. Pat. No. 10,129,853 entitled "Operating a Motion Detection Channel in a Wireless Communication Network," U.S. Pat. No. 10,111,228 entitled "Selecting Wireless Communication Channels Based on Signal Quality Metrics," and other techniques.

In some cases, a motion detection system operates based on wireless signals communicated in a wireless local area network, such as, for example, a Wi-Fi network that operates according to a Wi-Fi standard (e.g., any of the 802.11 Wi-Fi standards available from IEEE). The examples described here in the context of "Wi-Fi motion" can be applied in other types of wireless communication networks. In some examples, Wi-Fi motion can use existing in-home Wi-Fi to passively detect human motion in and around the home. Knowledge of motion is an important input into many systems. For example, household applications can collect motion information as part of their service to their customer. Motion can be identified according to thresholds that indicate a level of motion in combination with some degree of spatial awareness.

In some contexts, there are challenges in collecting motion information through certain types of wearable devices or tracking applications. Consequently, when a tracking application or wearable device is not installed or used as intended, motion information may be unavailable. For example, an activity tracker that measures steps typically works only when the customer is wearing it. Additionally, customers may be averse to investing in multiple costly wearables and/or motion tracking devices to accommodate applications that do not share data. Furthermore, battery life and processing restrictions of the wearable can limit the amount of motion insight that can be obtained.

By examining existing Wi-Fi signals, in environments with such an active Wi-Fi motion system, motion information can be passively generated without a dependence on additional motion tracking devices. The Wi-Fi signals can be processed by edge devices (e.g., edge motion processors deployed on an access point or another network-connected device) to obtain motion data. These signals can be processed on the Wi-Fi devices but outside the main Wi-Fi processing path. This allows incorporation in existing Wi-Fi products without an impact to the system or a need for re-certification. Motion data can be converted to motion information (or context) and provided to registered third-party entities (e.g., motion users) as part of a motion service. A motion service can be a cloud hosted service that receives motion data and converts it into motion information. A consumer can receive the motion information within a motion application or some other form of agreed notification service.

FIG. 1 illustrates an example wireless communication system 100 that can be used for motion detection. The technical improvements and advantages achieved from using the wireless communication system 100 to detect motion are also applicable in examples where the wireless communication system 100 is used for another wireless sensing application.

The example wireless communication system 100 includes three wireless communication devices 102A, 102B, 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include: networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point or another type of wireless access point (WAP). In some cases, one or more of the wireless communication devices 102 is an access point of a wireless mesh network, such as, for example, a commercially-available mesh network system (e.g., GOOGLE Wi-Fi, EERO mesh, etc.). In some instances, one or more of the wireless communication devices 102 can be implemented as WAPs in a mesh network, while the other wireless communication device(s) 102 are implemented as edge devices (e.g., mobile devices, smart devices, etc.) that access the mesh network through one of the APs. In some cases, one or more of the wireless communication devices 102 is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

In the example shown in FIG. 1, the wireless communication devices transmit wireless signals to each other over wireless communication links (e.g., according to a wireless network standard or a non-standard wireless communication protocol), and the wireless signals communicated between the devices can be used as motion probes to detect motion of objects in the signal paths between the devices. In some implementations, standard signals (e.g., channel sounding signals, beacon signals), non-standard reference signals, or other types of wireless signals can be used as motion probes.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. In some instances, the motion detection zones 110 can include, for example, air, solid materials, liquids, or another medium through which wireless electromagnetic signals may propagate.

In the example shown in FIG. 1, when an object moves in any of the motion detection zones 110, the motion detection system may detect the motion based on signals transmitted through the relevant motion detection zone 110. Generally, the object can be any type of static or moveable object, living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals propagate through a structure (e.g., a wall) before or after interacting with a moving object, which may allow the object's motion to be detected without an optical line-of-sight between the moving object and the transmission or receiving hardware. In some instances, the motion detection system may communicate the motion detection event to another device or system, such as a security system or a control center.

In some cases, the wireless communication devices 102 themselves are configured to perform one or more operations of the motion detection system, for example, by executing computer-readable instructions (e.g., software or firmware) on the wireless communication devices. For example, each device may process received wireless signals to detect motion based on changes in the communication channel. In some cases, another device (e.g., a remote server, a cloud-based computer system, a network-attached device, etc.) is configured to perform one or more operations of the motion detection system. For example, each wireless communication device 102 may send channel information to a specified device, system, or service that performs operations of the motion detection system.

In an example aspect of operation, wireless communication devices 102A, 102B may broadcast wireless signals or address wireless signals to the other wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object in a space accessed by the wireless signals (e.g., in the zones 110A, 110B). In some instances, the wireless communication device 102C (or another system or device) may perform one or more operations of a motion detection system.

Figure 2A:
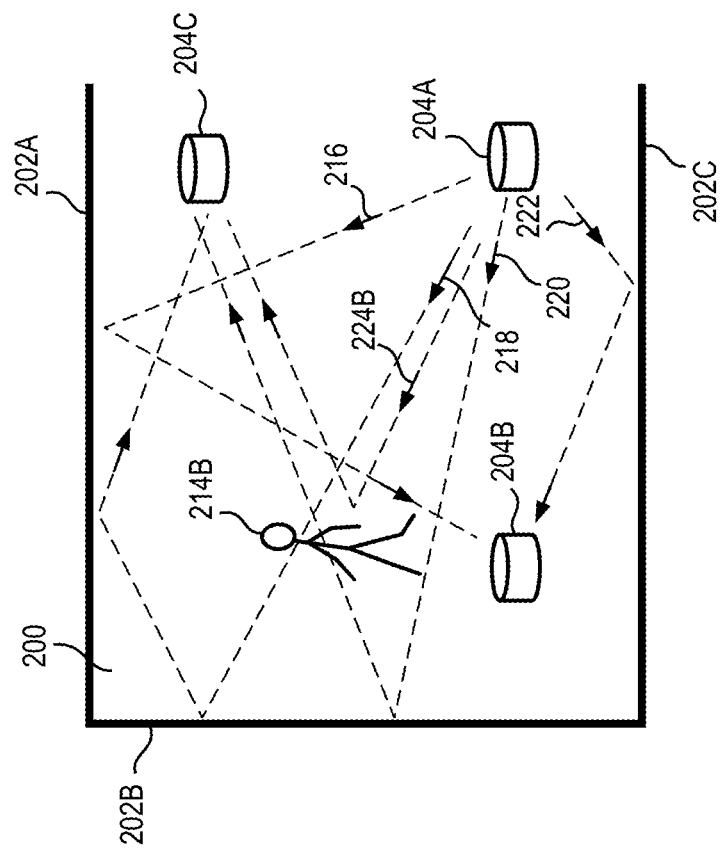
FIGS. 2A-2B are diagrams showing example wireless signals communicated between wireless communication devices.
Figure 2B:
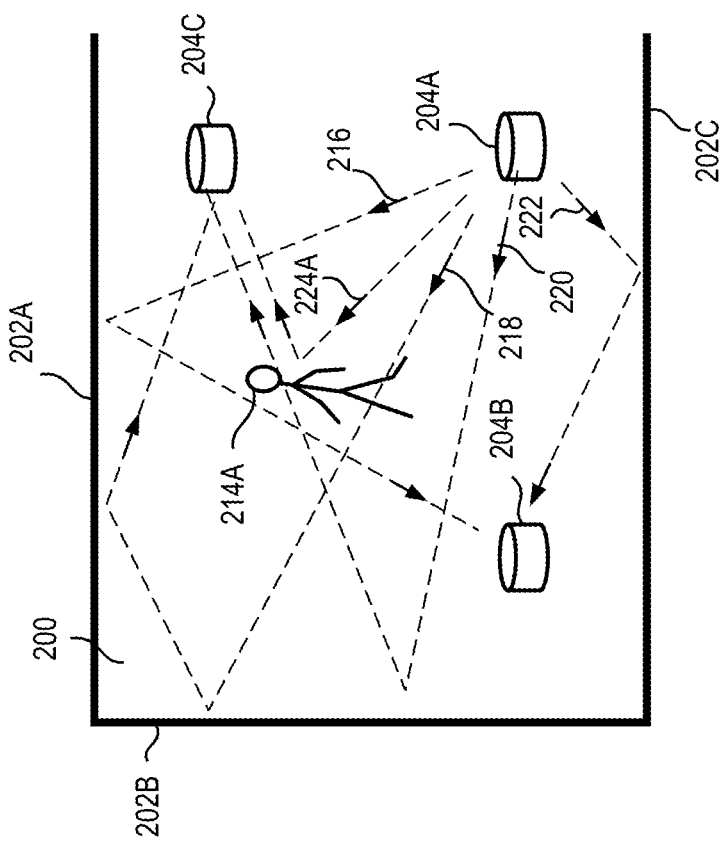

FIGS. 2A and 2B are diagrams showing example wireless signals communicated between wireless communication devices 204A, 204B, 204C. The wireless communication devices 204A, 204B, 204C can be, for example, the wireless communication devices 102A, 102B, 102C shown in FIG. 1, or may be other types of wireless communication devices.

In some cases, a combination of one or more of the wireless communication devices 204A, 204B, 204C can be part of, or may be used by, a motion detection system. The example wireless communication devices 204A, 204B, 204C can transmit wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A transmits wireless motion probe signals repeatedly (e.g., periodically, intermittently, at scheduled, unscheduled, or random intervals, etc.). The second and third wireless communication devices 204B, 204C receive signals based on the motion probe signals transmitted by the wireless communication device 204A.

As shown, an object is in a first position 214A at an initial time (t0) in FIG. 2A, and the object has moved to a second position 214B at subsequent time (t1) in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object. In the example shown in FIGS. 2A and 2B, the wireless communication devices 204A, 204B, 204C are stationary and are, consequently, at the same position at the initial time t0 and at the subsequent time t1. However, in other examples, one or more of the wireless communication devices 204A, 204B, 204C are mobile and may move between initial time t0 and subsequent time t1.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time to in FIG. 2A and time t1 in FIG. 2B, the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B can experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

The transmitted signal can have a number of frequency components in a frequency bandwidth, and the transmitted signal may include one or more bands within the frequency bandwidth. The transmitted signal may be transmitted from the first wireless communication device 204A in an omnidirectional manner, in a directional manner, or otherwise. In the example shown, the wireless signals traverse multiple respective paths in the space 200, and the signal along each path can become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset applied to a wireless signal along a signal path can change, and hence, the transfer function of the space 200 can change. When the same wireless signal is transmitted from the first wireless communication device 204A, if the transfer function of the space 200 changes, the output of that transfer function, e.g. the received signal, can also change. A change in the received signal can be used to detect motion of an object. Conversely, in some cases, if the transfer function of the space does not change, the output of the transfer function—the received signal—may not change.

Figure 2C:
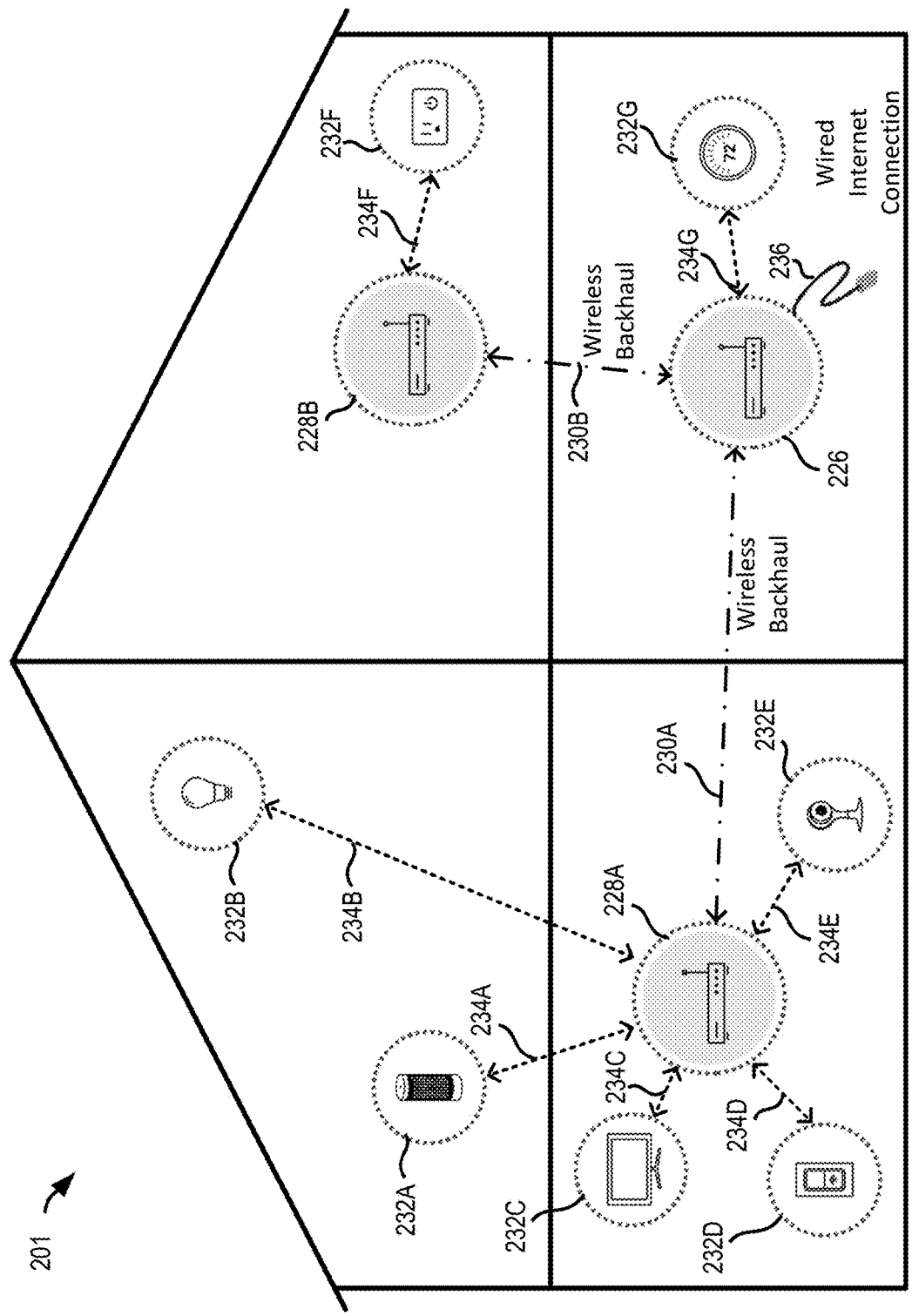
FIG. 2C is a diagram showing an example wireless sensing system operating to detect motion in a space.

FIG. 2C is a diagram showing an example wireless sensing system operating to detect motion in a space 201. The example space 201 shown in FIG. 2C is a home that includes multiple distinct spatial regions or zones. In the example shown, the wireless motion detection system uses a multi-AP home network topology (e.g., mesh network or a Self-Organizing-Network (SON)), which includes three access points (APs): a central access point 226 and two extension access points 228A, 228B. In a typical multi-AP home network, each AP typically supports multiple bands (2.4G, 5G, 6G), and multiple bands may be enabled at the same time. Each AP can use a different Wi-Fi channel to serve its clients, as this may allow for better spectrum efficiency.

In the example shown in FIG. 2C, the wireless communication network includes a central access point 226. In a multi-AP home Wi-Fi network, one AP may be denoted as the central AP. This selection, which is often managed by manufacturer software running on each AP, is typically the AP that has a wired Internet connection 236. The other APs 228A, 228B connect to the central AP 226 wirelessly, through respective wireless backhaul connections 230A, 230B. The central AP 226 may select a wireless channel different from the extension APs to serve its connected clients.

In the example shown in FIG. 2C, the extension APs 228A, 228B extend the range of the central AP 226, by allowing devices to connect to a potentially closer AP or different channel. The end user need not be aware of which AP the device has connected to, as all services and connectivity would generally be identical. In addition to serving all connected clients, the extension APs 228A, 228B connect to the central AP 226 using the wireless backhaul connections 230A, 230B to move network traffic between other APs and provide a gateway to the Internet. Each extension AP 228A, 228B may select a different channel to serve its connected clients.

In the example shown in FIG. 2C, client devices (e.g., Wi-Fi client devices) 232A, 232B, 232C, 232D, 232E, 232F, 232G are associated with either the central AP 226 or one of the extension APs 228 using a respective wireless link 234A, 234B, 234C, 234D, 234E, 234F, 234G. The client devices 232 that connect to the multi-AP network may operate as edge devices in the multi-AP network. In some implementations, the client devices 232 may include wireless-enabled devices (e.g., mobile devices, a smartphone, a smart watch, a tablet, a laptop computer, a smart thermostat, a wireless-enabled camera, a smart TV, a wireless-enabled speaker, a wireless-enabled power socket, etc.).

When the client devices 232 seek to connect to and associate with their respective APs 226, 228, the client devices 232 may go through an authentication and association phase with their respective APs 226, 228. Among other things, the association phase assigns address information (e.g., an association ID or another type of unique identifier) to each of the client devices 232. For example, within the IEEE 802.11 family of standards for Wi-Fi, each of the client devices 232 can identify itself using a unique address (e.g., a 48-bit address, an example being the MAC address), although the client devices 232 may be identified using other types of identifiers embedded within one or more fields of a message. The address information (e.g., MAC address or another type of unique identifier) can be either hardcoded and fixed, or randomly generated according to the network address rules at the start of the association process. Once the client devices 232 have associated to their respective APs 226, 228, their respective address information may remain fixed. Subsequently, a transmission by the APs 226, 228 or the client devices 232 typically includes the address information (e.g., MAC address) of the transmitting wireless device and the address information (e.g., MAC address) of the receiving device.

In the example shown in FIG. 2C, the wireless backhaul connections 230A, 230B carry data between the APs and may also be used for motion detection. Each of the wireless backhaul channels (or frequency bands) may be different than the channels (or frequency bands) used for serving the connected Wi-Fi devices.

In the example shown in FIG. 2C, wireless links 234A, 234B, 234C, 234D, 234E, 234F, 234G may include a frequency channel used by the client devices 232A, 232B, 232C, 232D, 232E, 232F, 232G to communicate with their respective APs 226, 228. Each AP can select its own channel independently to serve their respective client devices, and the wireless links 234 may be used for data communications as well as motion detection.

The motion detection system, which may include one or more motion detection or localization processes running on one or more of the client devices 232 or on one or more of the APs 226, 228, may collect and process data (e.g., channel information) corresponding to local links that are participating in the operation of the wireless sensing system. The motion detection system can be installed as a software or firmware application on the client devices 232 or on the APs 226, 228, or may be part of the operating systems of the client devices 232 or the APs 226, 228.

In some implementations, the APs 226, 228 do not contain motion detection software and are not otherwise configured to perform motion detection in the space 201. Instead, in such implementations, the operations of the motion detection system are executed on one or more of the client devices 232. In some implementations, the channel information may be obtained by the client devices 232 by receiving wireless signals from the APs 226, 228 (or possibly from other client devices 232) and processing the wireless signal to obtain the channel information. For example, the motion detection system running on the client devices 232 can have access to channel information provided by the client device's radio firmware (e.g., Wi-Fi radio firmware) so that channel information may be collected and processed.

In some implementations, the client devices 232 send a request to their corresponding APs 226, 228 to transmit wireless signals that can be used by the client device as motion probes to detect motion of objects in the space 201. The request sent to the corresponding APs 226, 228 may be a null data packet frame, a beamforming request, a ping, standard data traffic, or a combination thereof. In some implementations, the client devices 232 are stationary while performing motion detection in the space 201. In other examples, one or more of the client devices 232 can be mobile and may move within the space 201 while performing motion detection.

Mathematically, a signal f(t) transmitted from a wireless communication device (e.g., the wireless communication device 204A in FIGS. 2A and 2B or the APs 226, 228 in FIG. 2C) may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a wireless communication device (e.g., the wireless communication devices 204B, 204C in FIGS. 2A and 2B or the client devices 232 in FIG. 2C) can then be analyzed (e.g., using one or more motion detection algorithms) to detect motion. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}}. \quad (5)$$

The complex value $Y_n$ for a given frequency component on indicates a relative magnitude and phase offset of the received signal at that frequency component $\omega_n$. The signal f(t) may be repeatedly transmitted within a time period, and the complex value $Y_n$ can be obtained for each transmitted signal f(t). When an object moves in the space, the complex value $Y_n$ changes over the time period due to the channel response $\alpha_{n,k}$ of the space changing. Accordingly, a change detected in the channel response (and thus, the complex value $Y_n$) can be indicative of motion of an object within the communication channel. Conversely, a stable channel response may indicate lack of motion. Thus, in some implementations, the complex values $Y_n$ for each of multiple devices in a wireless network can be processed to detect whether motion has occurred in a space traversed by the transmitted signals f(t). The channel response can be expressed in either the time-domain or frequency-domain, and the Fourier-Transform or Inverse-Fourier-Transform can be used to switch between the time-domain expression of the channel response and the frequency-domain expression of the channel response.

In another aspect of FIGS. 2A, 2B, 2C, beamforming state information may be used to detect whether motion has occurred in a space traversed by the transmitted signals f(t). For example, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. In some instances, changes to the steering or feedback properties used in the beamforming process indicate changes, which may be caused by moving objects in the space accessed by the wireless signals. For example, motion may be detected by identifying substantial changes in the communication channel, e.g. as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these beamforming matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

Figure 3:
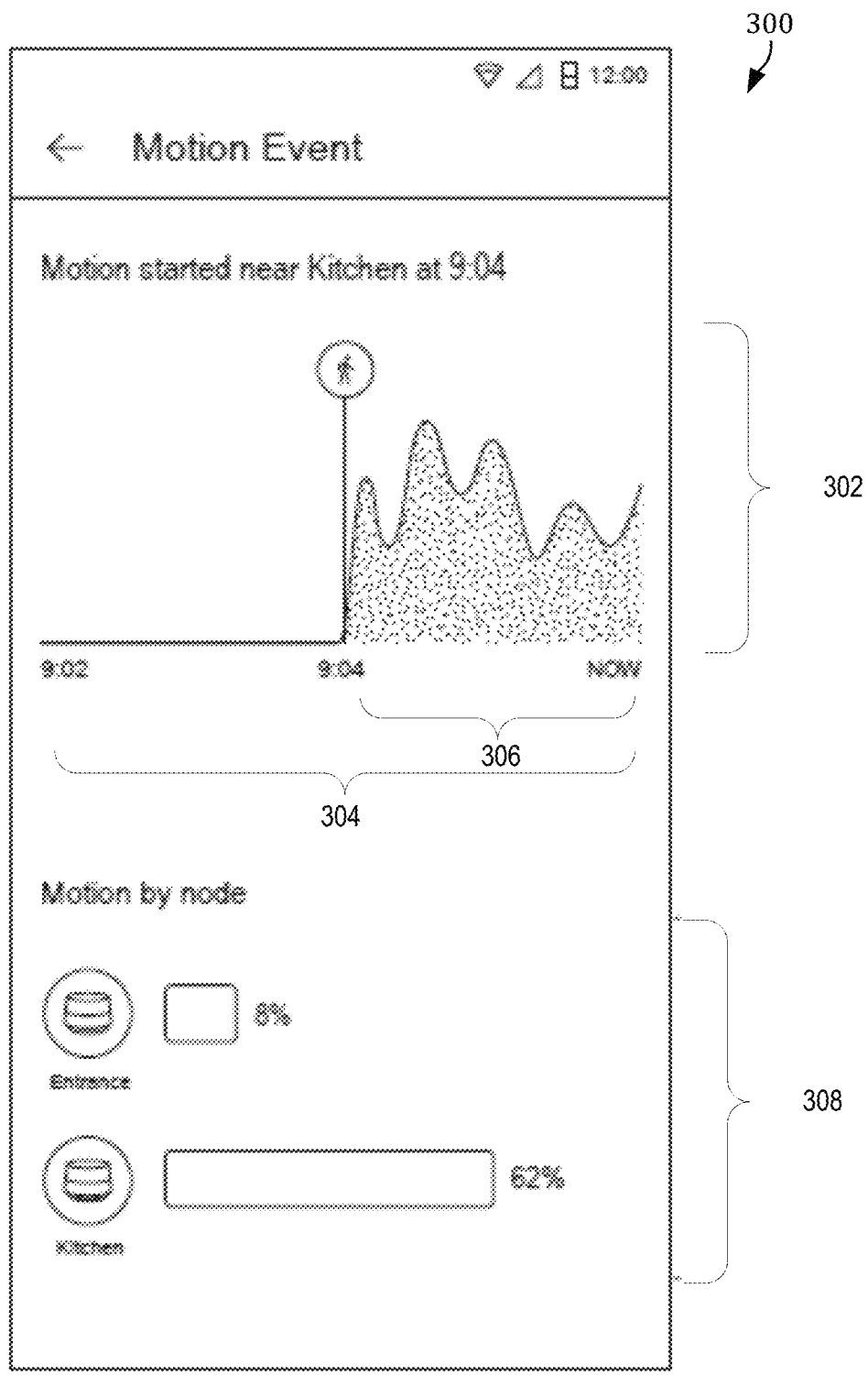
FIG. 3 is a diagram showing an example graphical display on a user interface on a user device.

In some implementations, the output of the motion detection system may be provided as a notification for graphical display on a user interface on a user device. FIG. 3 is a diagram showing an example graphical display on a user interface 300 on a user device. In some implementations, the user device is the client device 232 used to detect motion, a user device of a caregiver or emergency contact designated to an individual in the space 200, 201, or any other user device that is communicatively coupled to the motion detection system to receive notifications from the motion detection system.

The example user interface 300 shown in FIG. 3 includes an element 302 that displays motion data generated by the motion detection system. As shown in FIG. 3, the element 302 includes a horizontal timeline that includes a time period 304 (including a series of time points 306) and a plot of motion data indicating a degree of motion detected by the motion detection system for each time point in the series of time points 306. In the example shown, the user is notified that the detected motion started near a particular location (e.g., the kitchen) at a particular time (e.g., 9:04), and the relative degree of motion detected is indicated by the height of the curve at each time point.

The example user interface 300 shown in FIG. 3 also includes an element 308 that displays the relative degree of motion detected by each node of the motion detection system. In particular, the element 308 indicates that 8% of the motion was detected by the "Entrance" node (e.g., an AP installed at the home entry) while 62% of the motion was detected by the "Kitchen" node (e.g., an AP installed in the kitchen). The data provided in the elements 302, 308 can help the user determine an appropriate action to take in response to the motion detection event, correlate the motion detection event with the user's observation or knowledge, determine whether the motion detection event was true or false, etc.

In some implementations, the output of the motion detection system may be provided in real-time (e.g., to an end user). Additionally or alternatively, the output of the motion detection system may be stored (e.g., locally on the wireless communication devices 204, client devices 232, the APs 226, 228, or on a cloud-based storage service) and analyzed to reveal statistical information over a time frame (e.g., hours, days, or months). An example where the output of the motion detection system may be stored and analyzed to reveal statistical information over a time frame is in health monitoring, vital sign monitoring, sleep monitoring, etc. In some implementations, an alert (e.g., a notification, an audio alert, or a video alert) may be provided based on the output of the motion detection system. For example, a motion detection event may be communicated to another device or system (e.g., a security system or a control center), a designated caregiver, or a designated emergency contact based on the output of the motion detection system.

Figure 4:
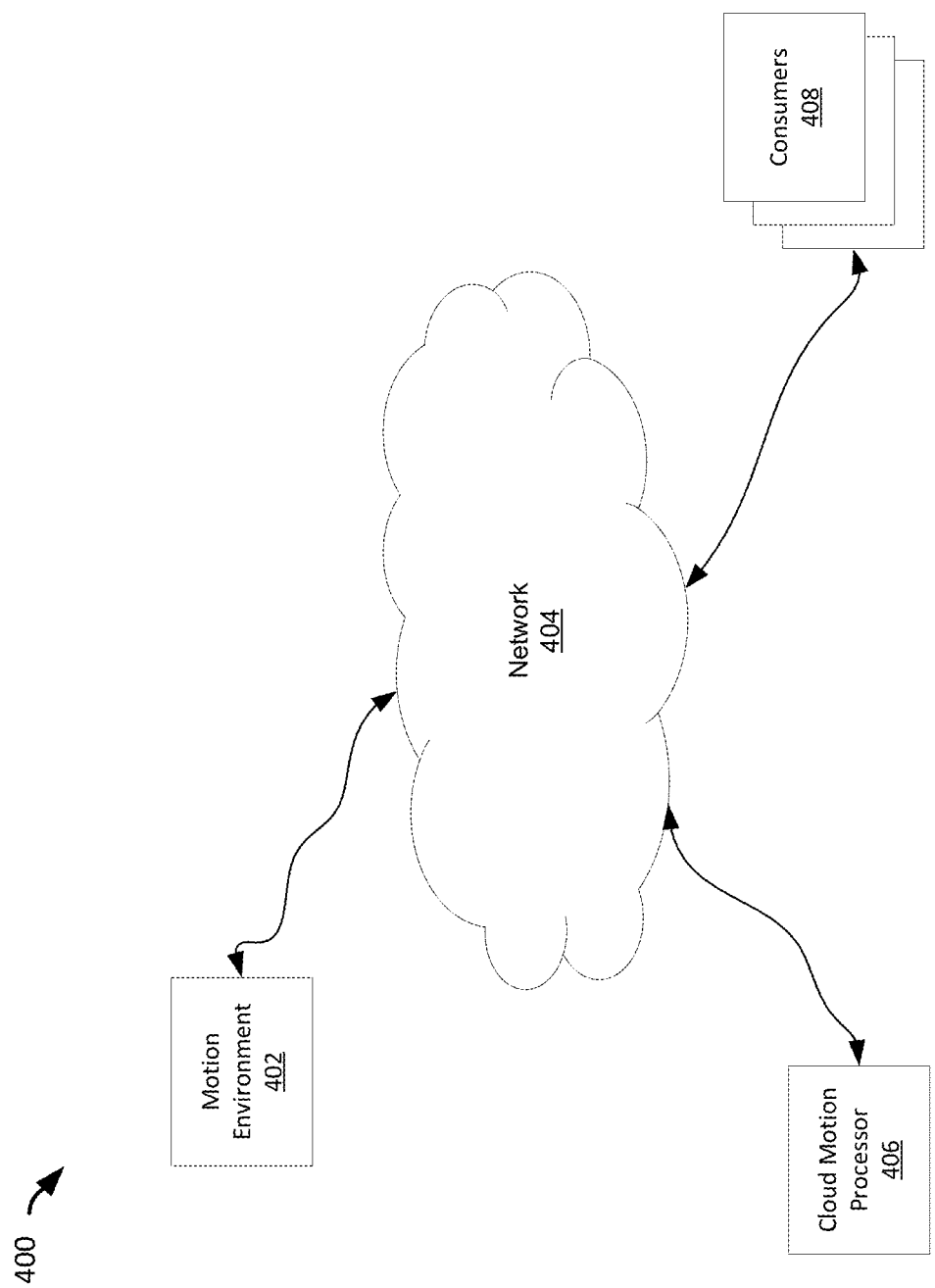
FIG. 4 is a block diagram of an example computing environment.

FIG. 4 is a block diagram showing aspects of an example computing environment 400. The example computing environment 400 includes a motion environment 402, a cloud motion processor 406, one or more consumers 408, and a network 404 connecting them. The motion environment 402 includes wireless communication devices that communicate with each other wirelessly, for example, by exchanging wireless signals (e.g., Wi-Fi signals). The motion environment 402 may include one or more aspects of the example systems described with respect to FIGS. 1, 2A-2C, and 5, or the motion environment may be implemented in another manner. The motion environment 402 may also include edge motion devices that can process the Wi-Fi signals and generate motion data indicating the occurrence of motion within the motion environment. An edge motion device may be a wireless device and may include one or more aspects of the examples described with respect to FIGS. 1, 2A-2C, 5, 7, 9, 10, or edge motion devices may be implemented in another manner.

The block diagram of FIG. 4 also shows a cloud motion processor 406. The cloud motion processor 406 can receive motion data from the motion environment 402, process it, and provide motion information. The cloud motion processor 406 may operate as described with respect to one or more of the examples in FIGS. 5, 6, 7, 8, 9, 10, 12, 13, 14, or the cloud motion processor 406 may operate in another manner. In some examples, the cloud motion processor 406 can be hosted in a cloud computing data center and obtain motion data over a network. In an example, the network 404 may be the Internet. In another example, the network 404 may be a home network. In yet another example, the network 404 may include a combination of the Internet and a home network. Multiple motion environments 402 may provide motion data over the network 404 to the cloud motion processor 406. A motion environment 402 can store motion data within the motion environment and asynchronously transfer it to the cloud motion processor 406, for example, if a network outage prevents immediate transfer of the motion data. In an example, multiple networks 404 may be available to provide a conduit for the motion data of the motion environment to be transmitted to the cloud motion processor 406.

In some instances, the cloud motion processor 406 provides motion information to one or more consumers 408 for additional processing and presentation. The motion information provided to each consumer may be distinct from the motion information provided to other consumers.

Figure 5:
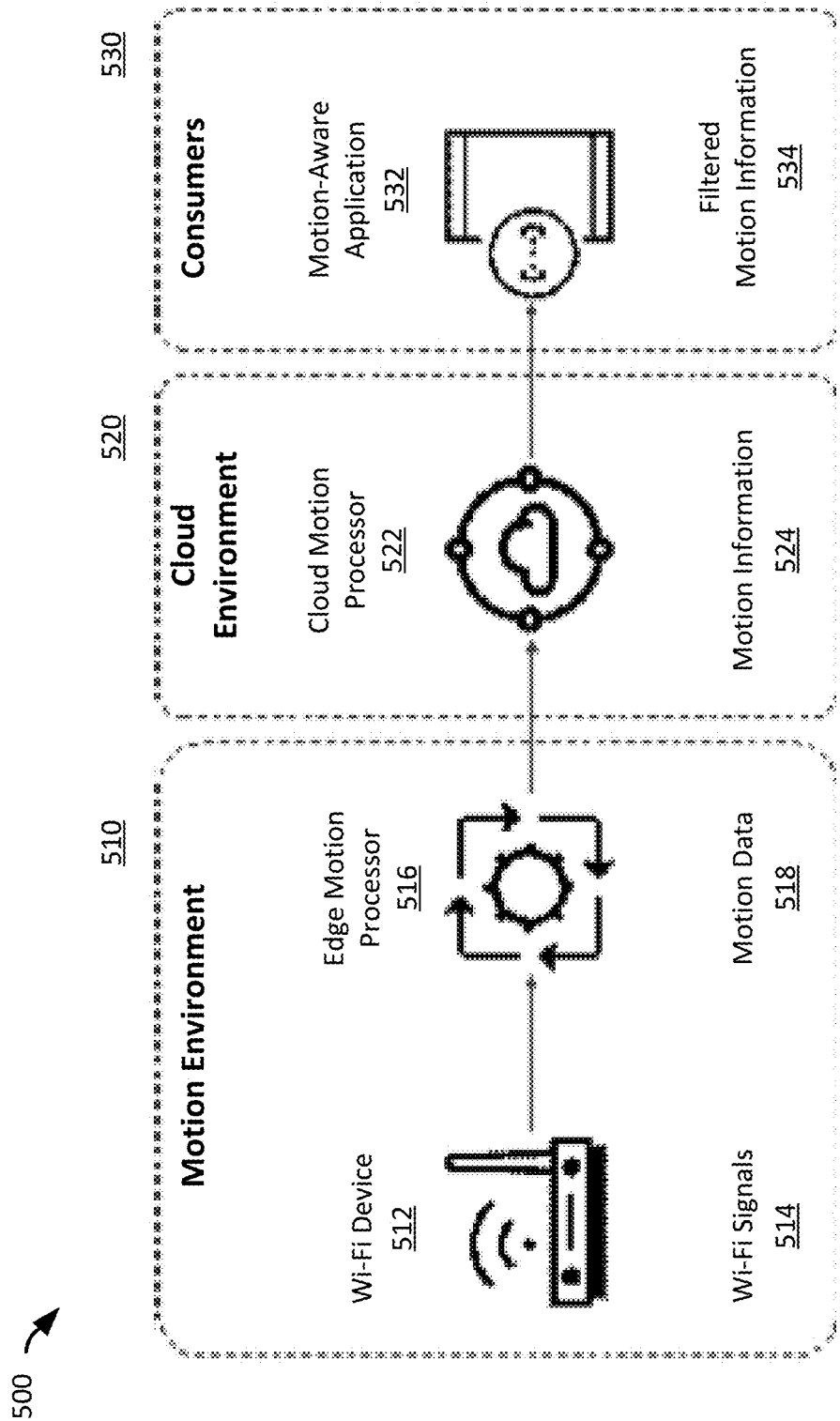
FIG. 5 is an example Wi-Fi motion system.

FIG. 5 illustrates an example Wi-Fi motion system 500. The example Wi-Fi motion system 500 includes a motion environment 510, a cloud environment 520, and consumers 530. The example motion environment 510, has disposed therein at least one Wi-Fi device 512 that produce Wi-Fi signals 514. In various implementations, the Wi-Fi devices 512 may be the wireless communication devices 102A, 102B, 102C of FIG. 1 or the wireless communication devices 204A, 204B, 204C of FIGS. 2A and 2B. In an example, the Wi-Fi signals 514 are consumed by edge motion processors 516 to derive motion data 518. In various implementations, motion data 518 may include, for example, channel state information derived from the Wi-Fi signals 514. A Wi-Fi motion system and motion environment may include additional or different features, and they may operate as described with respect to FIG. 5 or in another manner.

In the example shown in FIG. 5, the motion data 518 indicating detected motion in the motion environment 510 is transmitted from a Wi-Fi device 512 to a cloud motion processor 522. In various implementations, the motion processor 522 resides in a cloud-based computer system. The motion data 518 is further processed by the cloud motion processor 522 to produce motion information 524 related to the detected motion. In various implementations, the motion information 524 may include, for example, temporal and spatial ranges of motion or a path traversed during a specific motion event. In various implementations, the motion information aids the detection of an occurrence or non-occurrence of a pre-defined motion event. In an example, the cloud motion processor 522 may communicate with the Wi-Fi device 512 via a network. In an example, the network may be a public network such as the Internet. In another example, the cloud motion processor 522 may be part of a home network. In various implementations, the cloud motion processor 522 may correspond to the cloud motion processor 406 described above and shown in FIG. 4.

The motion information 524 can then be filtered or otherwise processed by the motion service provider and the filtered motion information 534 made available to motion aware applications 532 provided by consumers 530. In some implementations, consumers may be 3rd parties. As will be discussed in more detail hereinbelow, in various implementations, processing of the motion information 524 may include application of a classifier to the motion information 524. In various implementations, the classifier is a function that determines, from the motion information 524, the occurrence of a pattern of motion related to a pre-defined motion event. In an example, a pre-defined motion event could be the occurrence of motion inside a residence during a period of time when the occupants are known to be away. In another example, the pre-defined motion event could be the non-occurrence of a regularly-occurring motion pattern. For instance, if an occupant of the residence is known to walk from a bedroom to a kitchen each morning, then the non-occurrence of this pattern of motion could be classified as a pre-defined motion event.

The extraction of the contextual information 524 from the motion data 518 can be performed by a motion service provider and used to provide motion information analysis to the owner of the Wi-Fi system (referred to as the system owner). A motion service provider is an entity having access to Wi-Fi and channel state information from the motion environment 510, such as the equipment manufacturer of the Wi-Fi hardware or an Internet Service Provider (ISP) providing Wi-Fi hardware to system owners. In some implementations, the consumer 530 may be the system owner. As will be discussed hereinbelow, in other implementations, the consumer 530 may be a third-party entity.

A system owner may have the rights to the motion information analysis, as it may be their motion environment that is being sensed. For example, a system owner may be a household member wanting to understand the motion in their home. In another example, the system owner could be a person or entity responsible for an environment and having a legitimate interest in understanding the motion in that environment. Alternatively, the system owner could be an ISP or property management company renting Wi-Fi equipment to the household and providing motion information to the household as part of a specialist service.

An advantage of such a system can be the delivery of relevant, timely, motion information analysis to the system owner. In many cases this is provided to the system owner directly by the motion service provider, requiring that the system owner use an application provided by the motion service provider. This is an example of direct delivery of motion information and involves the motion service provider assuming a new role and relationship as a provider of motion information analysis.

Delivering motion information analysis to a system owner can be extended to allow indirect delivery via third-party entities. These third-party entities may be entities that offer a product or service involving motion intelligence, and with whom the system owner has or wants a relationship. The third-party entities may already use motion information within their existing services, collected from proprietary devices or applications. However, these third-party entities may have a legitimate interest in accessing motion information from the larger motion environment 500 while reducing their dependency on applications and devices of their own for the collection of data. This can include third-party entities that want to provide additional benefits based on motion information but prefer not to provide their own hardware or motion tracking applications.

A motion information system should provide privacy and controlled access to the motion information. A system owner typically controls privacy and information sharing permissions related to the motion information and can authorize other parties to access and use the motion information.

Figure 6:
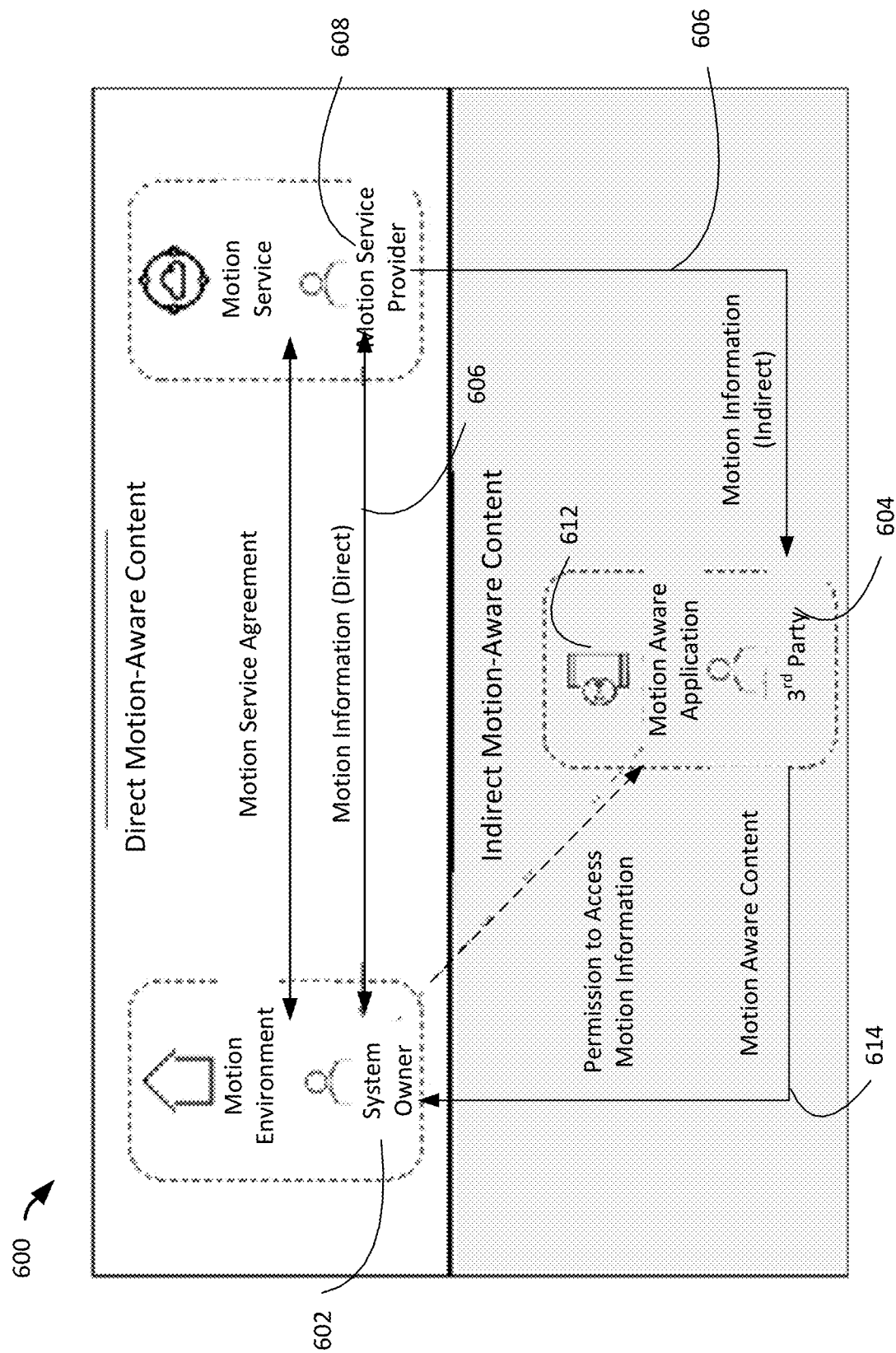
FIG. 6 is a block diagram showing an example comparison of direct and indirect delivery of motion information to a system owner.

FIG. 6 is a block diagram showing a comparison of direct and indirect delivery of motion information analysis to a system owner 602. As shown in FIG. 6, third party entities 604 can integrate motion information analysis from an authorized motion environment into their services. The motion information analysis 606 can be conveyed from the motion service provider 608 to the system owner 602, via the third-party entity 604, establishing an indirect motion context alert and notification system. With such a system, third-party entities 604 can access shared Wi-Fi motion information to provide motion aware content 614 and services to a household using the existing devices of the household. For example, a security company might no longer need to require the purchase and installation of passive infrared sensors. The data gathered from these sensors could instead be obtained from the Wi-Fi motion system. In another example, a home monitoring organization can eliminate fall detection and/or emergency call pendant devices in an eldercare environment, substituting access to the Wi-Fi motion system. As another example, a health or fitness company could determine overall household activity levels and report an individual's current workout metrics (and from which room in the house), without requiring dedicated activity tracking via a wearable device or a smartphone app.

In some cases, such a system can offer a secure and scalable approach to obtaining indirect Wi-Fi motion information analysis from a motion environment and delivering it to the system owner 602 via third-party entities that are registered and authorized to access the motion information without proprietary hardware or motion tracking applications. The information available to one third-party entity may be different from that available to another. Individual third-party entities 604 can be granted access to only that motion information the system owner 602 has authorized.

In an example, a system owner can grant permission 610 to a third-party entity to obtain motion information from a motion environment 510. Permission may be granted through an application 612. The third-party entity 604 can then register with the motion service provider 608 to access Wi-Fi motion information. Such a registration process can allow the system owner 602, having accounts with both the third-party entity 604 and the motion service provider 608, to configure and authorize the third-party entity 604 and motion service provider 608 to create a pairing through which motion information analysis can be shared. The relationship between the third-party entity 604 and either system owner 602 or the motion service provider 608 can be in place prior to registration. For example, the motion information analysis may already be available as a service. In an implementation, the motion information analysis can be provided as a service by the motion service provider 608 in which an existing relationship exists between the third-party entity 604 and the motion service provider 608.

Figure 7:
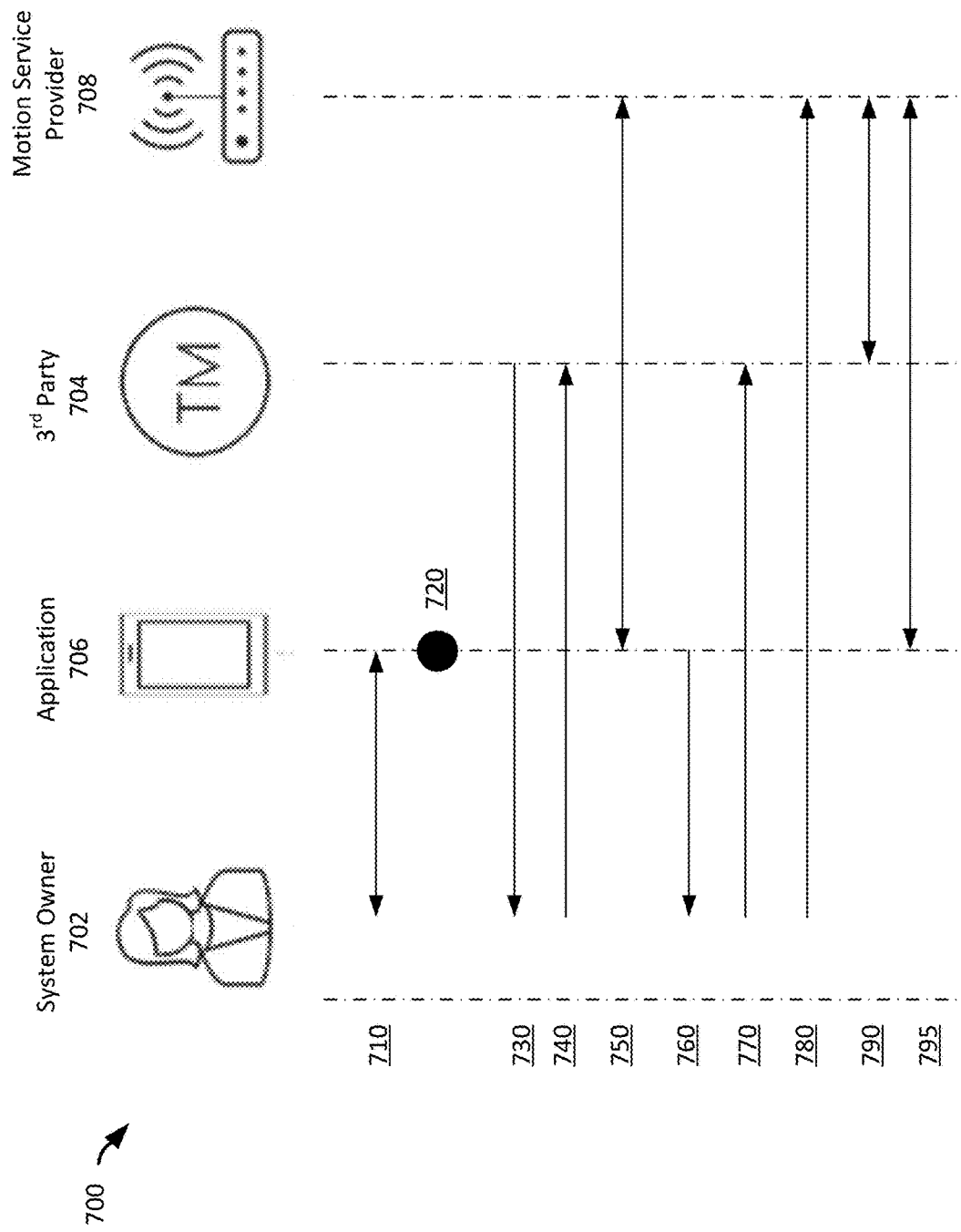
FIG. 7 is a diagram showing an example of a registration and pairing process.

FIG. 7 shows an example of a registration and pairing process 700, in which a system owner 702 grants restricted permission to a third-party entity 704 to access motion information. At 710, the interaction with the existing application 706 is indicated. In some implementations, direct motion-aware content is exchanged. In other cases, the system owner 702 is informed that there is a motion-aware feature which, if an indirect service is created, will result in motion-aware content. At 720, the motion aware feature is presented by the application 706. At 730, the third-party entity 704 requests permission from the system owner 702 to access the motion information. At 740, the system owner 702 grants the requested permission to the third-party entity 704. In an example, the requested/granted permission can be a subset of the available permissions. At 750, the third-party entity 704 performs a Wi-Fi motion capability/allowability check to ensure that there is a motion service provider 708 available that can support indirect motion service and that the third-party entity 704 has the appropriate permissions and access to motion information. At 760, the application 706 begins a registration process with the system owner 702. At 770, the system owner 702 configures their account with the third-party entity 704 for pairing. At 780, the system owner 702 configures their account with the motion service provider 708 for pairing. At 790, the third-party entity 704 pairs its application with the motion environment of the system owner 702. In various implementations, a correlation between the third-party entity 704 and the motion event requested by the third-party entity 704 is stored in a database. At 795, having successfully paired with the system owner's motion environment, the third-party entity 704 application provides and consumes information from the system owner's motion environment.

Registered and paired third-party entities 704 may then receive motion information alerts and notifications from the motion service provider 708. These alerts and notifications are private to the system owner 702 and the third-party entity 704. Similarly, information exchanged with the motion service provider 708 and a second third-party entity 704 are private to the system owner 702 and the second third-party entity 704.

As each third-party entity 704 can have unique needs for motion information, an indirect motion delivery subsystem can allow multiple third-party entities 704 to be efficiently and securely served, while providing scalability and efficiency to the delivery mechanism.

An indirect motion delivery subsystem may contain a classifier function, which can condense the individual motion information requests of multiple third-party entities 704 into motion classifiers. For example, if multiple third-party entities 704 request the same motion information such as, for example, notification of the most active hour of the day, this information can be efficiently determined once by a single classifier and notifications sent to the multiple third-party entities 704. Motion classifiers can be defined and instantiated in the motion-detection system to satisfy common tasks, or as part of a learning and adaptive process. Examples of predetermined or simple motion classifiers are busy hour detection and home intrusion detection. Classifiers can also be more complex and determine discrete locations, pathways, or sequence of motion events. Furthermore, motion classifiers can include trend and anomaly detection as well as artificial intelligence and machine learning. In various embodiments, classifiers are indicative of an occurrence or non-occurrence of a predetermined motion event. In various implementations, Using cloud processing techniques, e.g., microservices, a classifier's output can be converted to individual alerts and notifications for a registered third-party entities 704. The microservices concept can allow each third-party entity 704 to operate independently. A third-party entity's user interface can use a filtering and/or message dispatch process to ensure that motion information analysis is matched to motion information requests, and specific motion information provided only to those third-party entities having made an authorized request. In some cases, the filtering and/or message dispatch process can be performed within a microservice. In some cases, the message dispatch process can communicate motion information from a classifier to a microservice. The motion information requests of a particular third-party entity, and the resulting responses, can be kept confidential from other third-party entity.

Figure 8:
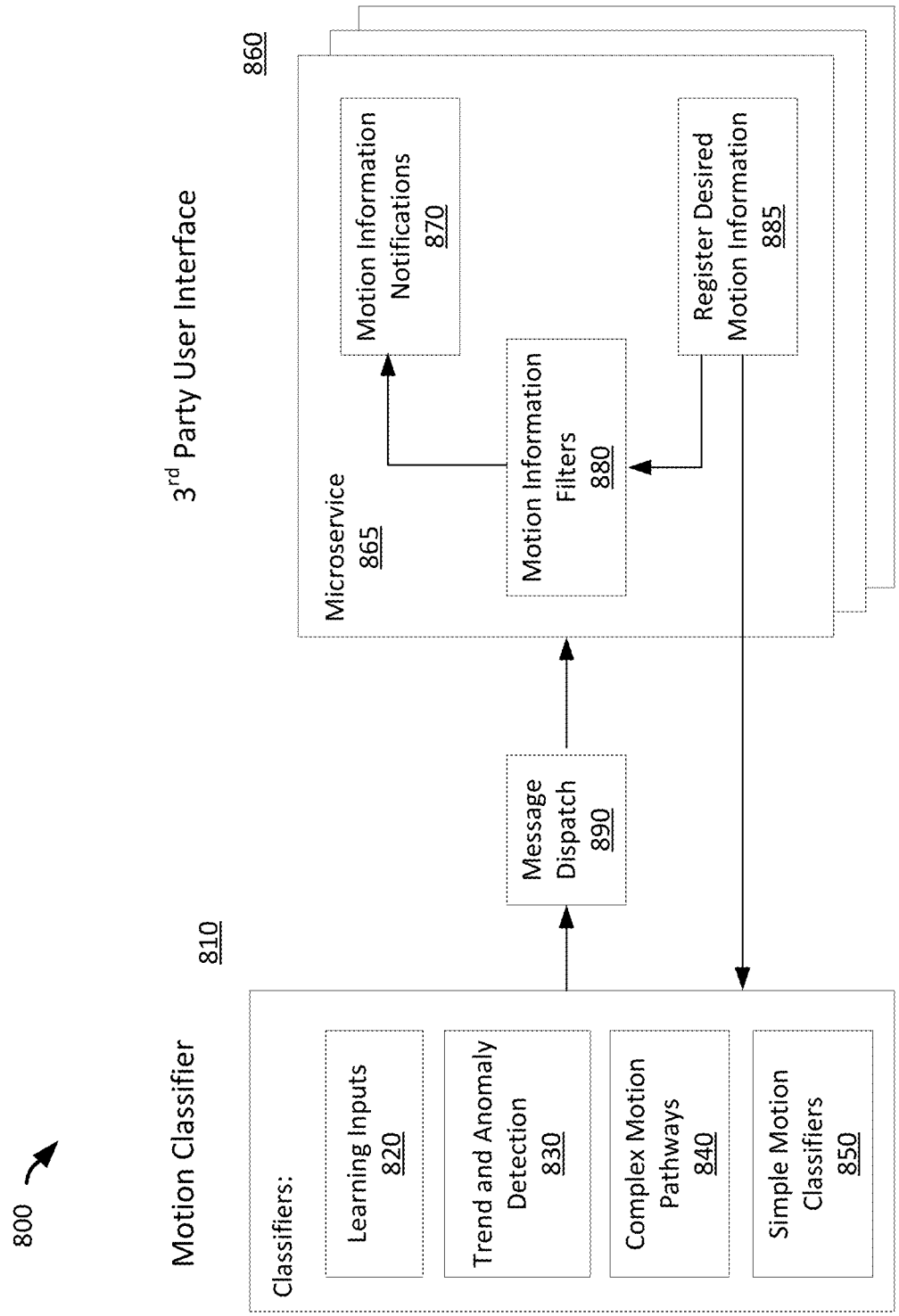
FIG. 8 is a block diagram of an example classifier subsystem.

FIG. 8 is a block diagram of an example classifier subsystem 800 for condensing motion information requests by third party entities into motion classifiers and notifying third-party entities when relevant motion information is available. Through individual third-party entity application user interfaces, 860, desired motion information can 885 be registered. This motion information can then be passed to a motion classifier 810. Motion information can be identified, for example, as a simple motion classifier 850, a complex motion pathway 840 or as a learning input 820 for machine learning or a component of trend and anomaly detection 830. In some implementations, information can be identified as other forms. Each 3rd party operates within a microservice 865, so as to restrict one third-party entity from information related to another third-party entity. A message dispatch process 890 matches motion information to motion information requests and sends the motion information to third-party entity microservices 865. In some implementations, the classifier 810 accesses a database. The database correlates predetermined motion events to those third-party entities that have registered an interest in one or more of the pre-determined motion events. The motion classifier 810 produces a notification when the incoming motion information is correctly classified. That output is delivered to the 3rd parties and associated microservices 865 that have registered to receive this information. Delivery can use techniques such as publish-subscribe. In some implementations, a message dispatch 890 system receives notifications from the classifier subsystem 800 and sends it to those microservices 865 for which a matching registration has been established. In some implementations, classifier output is broadcast or made available to all microservices. In this case, the microservice performs its own internal filtering. A microservice can also generate a notification based upon a previous filter match.

In addition, a hybrid processing subsystem can process motion data obtained from edge devices within a motion environment to simplify processing for a classifier. In an example, motion data can be obtained directly from edge devices within a motion environment. This motion data can take various forms. For example, motion data can be generic periodic motion data that is sufficiently high level and generic to be suitable for many classifier tasks. In another example, the motion data can be pre-processed to allow classifier tasks to be optimized. A hybrid processing subsystem allows a classifier to inform an edge device of its motion data requirements so that only the relevant motion data is transferred.

A system for providing the indirect delivery of motion information to system owners via third-party entities can combine a registration and pairing subsystem, as described with respect to FIG. 7, an indirect motion delivery subsystem, as described with respect to FIG. 6, and a hybrid processing subsystem.

Figure 9:
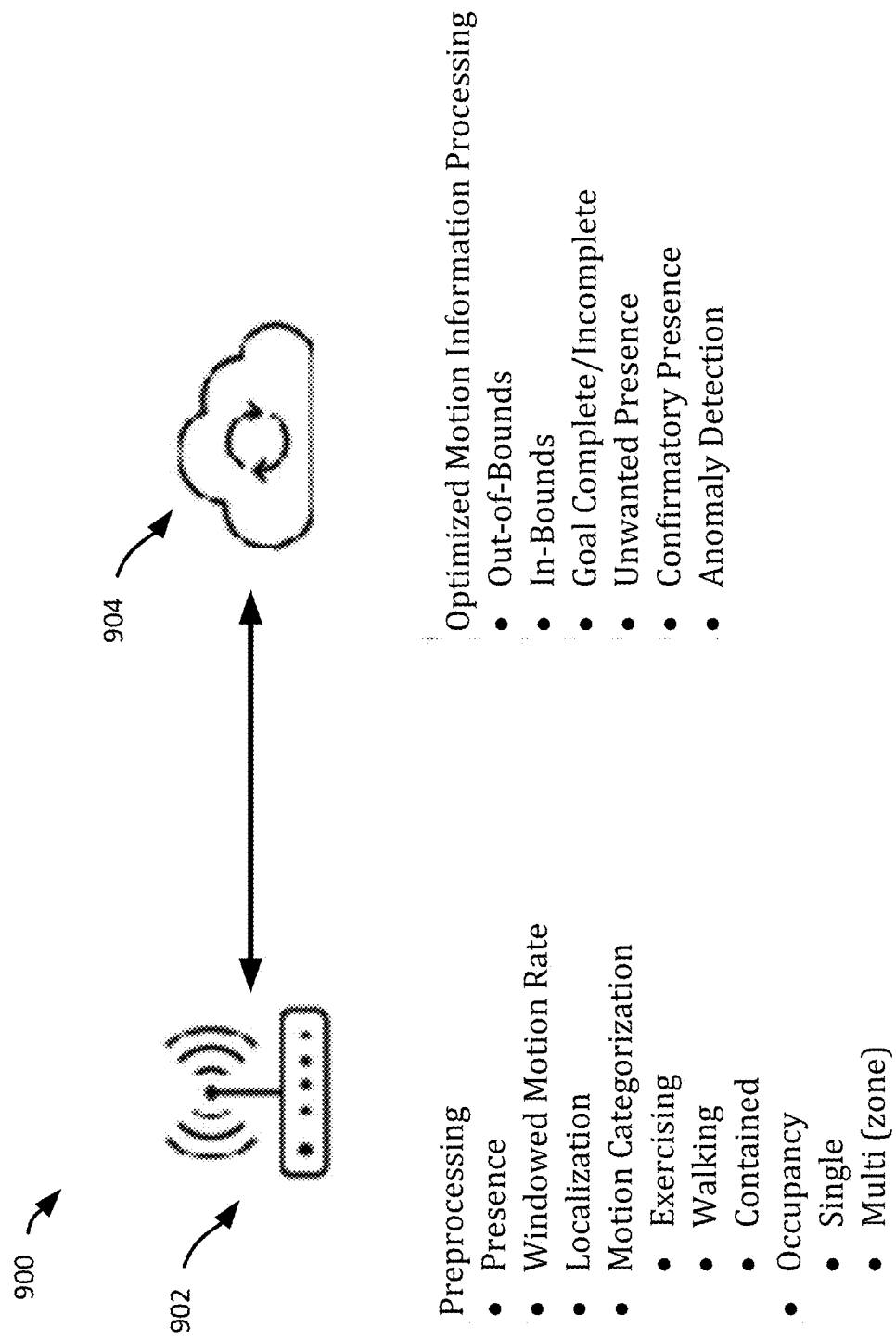
FIG. 9 is a diagram showing an example of hybrid processing of motion data.

FIG. 9 shows an example of hybrid processing of motion data 900, resulting in motion information. In various implementations, edge devices 902 provide data to a hybrid processing subsystem 904. The hybrid processing subsystem 904 can inform the edge devices 902 of its motion data requirements so as to minimize transfer of unwanted data and optimize motion data processing. In a first implementation, the edge device 902 may send motion data which may be further processed by the hybrid processing subsystem 904. In a second implementation, the hybrid processing subsystem 904 may inform the edge device 902 of preprocessing of the motion data that should occur on the edge device 902. In a third implementation, processing of the motion data at the edge device 902 may be the full extent of required processing and no further processing is needed by the hybrid processing subsystem 904.

Using requested motion information from an indirect motion delivery subsystem and any resulting motion classifiers, a hybrid processing system can determine the motion data needed from the edge devices and provide it to motion classifiers as appropriate. By condensing motion data to serve the third-party entity requirements, such a system can be highly efficient and scalable.

Figure 10:
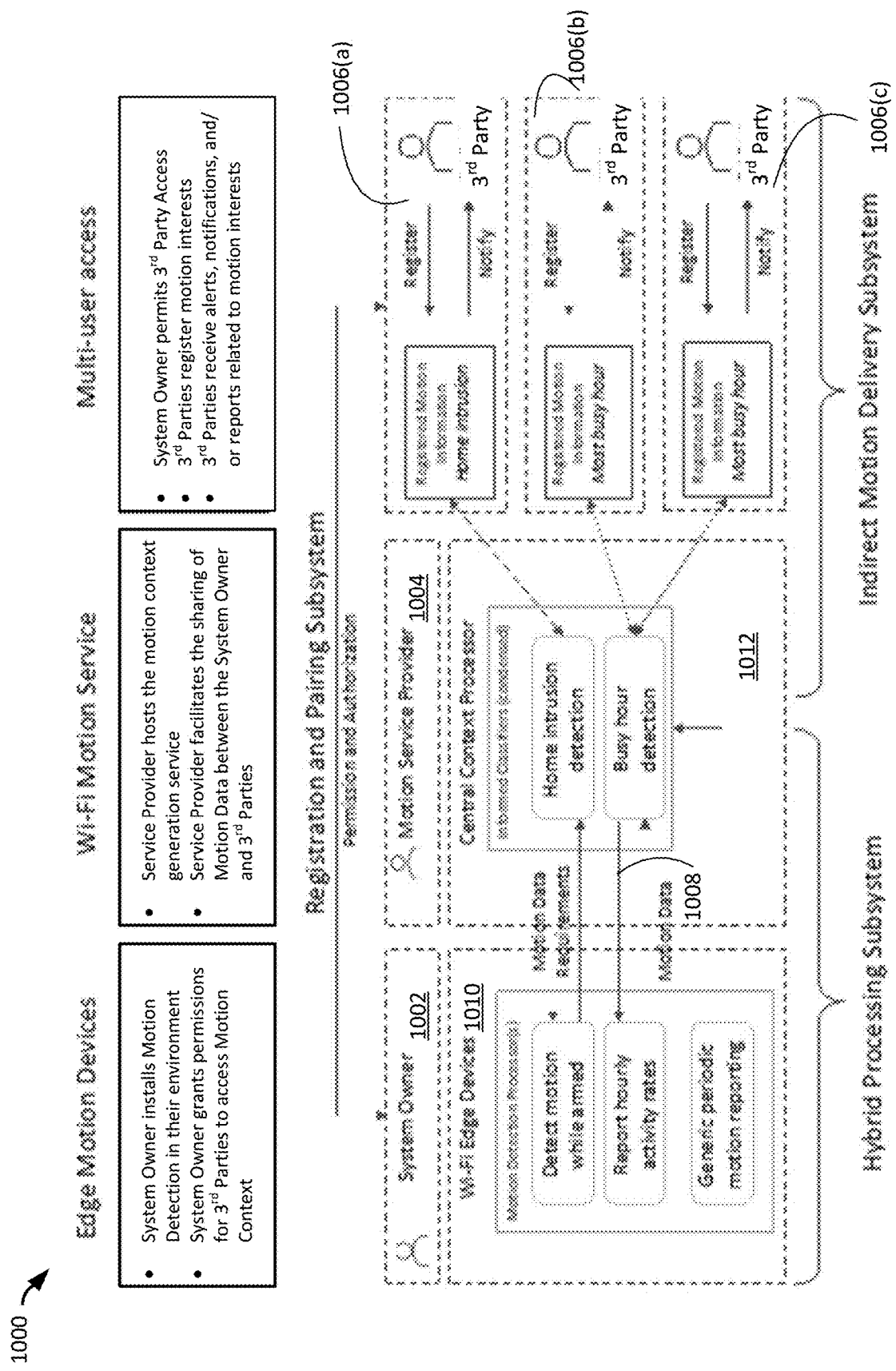
FIG. 10 is a block diagram of an example motion system.

FIG. 10 is a block diagram of an example motion system that integrates system owners 1002, motion service providers 1004, and third-party entities 1006 to efficiently provide and act upon motion events.

In the example illustrated in FIG. 10, motion data 1008 is provided by wireless communication devices 1010 to a cloud-based computer system 1012. In various implementations, the cloud-based computer system 1012 is a central context processor. Third party entities 1006 register an interest with the cloud-based computer system 1012 in being notified of the occurrence of a pre-defined motion event. For example, third-party entity 1006(*a*) is illustrated as having registered an interest in being notified of a potential home intrusion. Thus, an example pre-defined motion event could be the detection of motion during periods of time when the home owners are known to be away such as, for example, during working or school hours. Third-party entities 1006(*b*) and 1006(*c*) have both registered an interest in being notified of the most busy hour in a space. Thus, the predefined motion event could be the hour of the day with highest incidence of motion.

In some cases, classification of a motion context may utilize granular motion data and statistical processes to learn and identify motion types. Given the complexity of these calculations, the limited processing power of many Wi-Fi devices, and the costs and scaling challenges of cloud processing, classification of a motion context can be difficult to implement.

In some implementations, motion can be classified as signatures and other low-resolution data sets. Rather than manipulating high-resolution motion data that is expensive to transmit and store, the motion information can be condensed, in an efficient representation of motion. Such motion signatures can be generated on Wi-Fi hardware containing a motion detection processor with limited processing ability. Such motion signatures can constitute an efficient data set that describes the time, location, and pathway of a segment of motion, also termed a motion sequence. These signatures can be efficiently uploaded to and processed at a central context processor. At such a central context processor, which may possess greater computing power, the signatures can be analyzed over longer durations of time to build a statistical motion context that can be stored in a motion context store and used to derive real-time motion context information.

Figure 11:
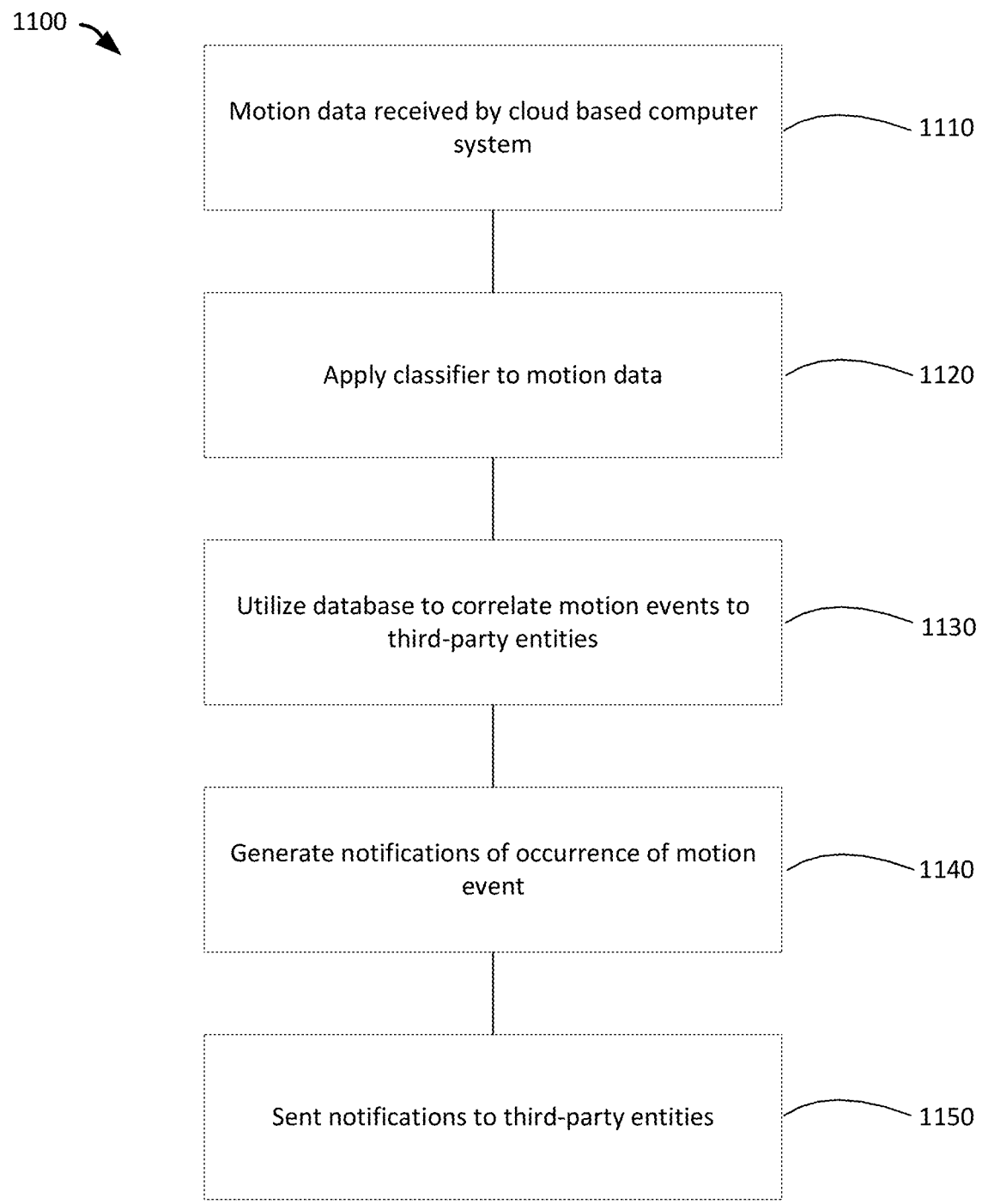
FIG. 11 is a flow diagram illustrating an example process performed by a cloud-based computer system.

FIG. 11 is a flow chart showing an example process 1100 performed, for example, by a cloud-based computer system. Operations in the example process 1100 may be performed by a data processing apparatus (e.g., a processor in a cloud motion processor in FIG. 4 or the cloud motion processor 522 in FIG. 5) to detect a location of motion based on signals transmitted from wireless communication devices. The example process 1100 may be performed by another type of device. For instance, operations of the process 1100 may be performed by a system other than a cloud-based computer system (e.g., a computer system connected to the wireless communication system 100 of FIG. 1A that aggregates and analyzes signals received by the wireless communication devices 102). The motion detection system can process information based on wireless signals transmitted (e.g., on wireless links between wireless communication devices) through a space to detect motion of objects in the space (e.g., as described with respect to FIGS. 1 and 2A, 2B, 2C, or otherwise).

The example process 1100 may include additional or different operations, and the operations may be performed in the order shown or in another order. In some cases, one or more of the operations shown in FIG. 11 are implemented as processes that include multiple operations, sub-processes, or other types of routines. In some cases, operations can be combined, performed in another order, performed in parallel, iterated or otherwise repeated, or performed another manner.

At 1110, motion data is received by the cloud-based computer system. In various implementations, the motion data may be, for example, the motion data 518 described in FIG. 5. The motion data is received from wireless communication devices that are associated with a motion detection system that is remote to the cloud-based computer system. In various implementations, the motion-detection system could be, for example, the Wi-Fi motion system 500. Likewise, the wireless communication devices could be, for example, the Wi-Fi device 512 of FIG. 5 or the edge devices 902 of FIG. 9. In various implementations, the motion data is derived from wireless signals communicated by the wireless communication devices. In various implementations, the wireless signals could be, for example, the signals 514 illustrated in FIG. 5.

At 1120, a classifier is applied to the motion data. In various implementations, the classifier is a function that is capable of detecting the occurrence of specified motion events. In various implementations, the specified motion events may be, for example, an occurrence of a particular pattern of motion at a specified time of day. In other implementations, the specified motion event could be, for example, the non-occurrence of such a pattern of motion. In various implementations, the classifier may be, for example, the classifier subsystem 800.

At 1130, the cloud-based computer system accesses a database in order to correlate a predefined motion event to one or more third-party entities that have registered for a notification of an occurrence of the predefined motion event. By accessing the database, the cloud-based computing system identifies a subset of third party entities that have registered an interest in the pre-defined motion event.

At 1140, notifications are generated to each third-party entity in the subset of third-party entities. In various implementations, the notification includes an indication that a predefined motion event occurred and also includes additional information about the occurrence of the predefined motion event. For example, the additional information could, in various implementations, include a time that the predefined motion event occurred or a spatial or temporal range of motion. In other implementations, the additional information may include, for example, a motion path traversed during the occurrence of the predefined motion event. At 1150, the notifications are sent to the subset of the third-party entities.

Figure 12:
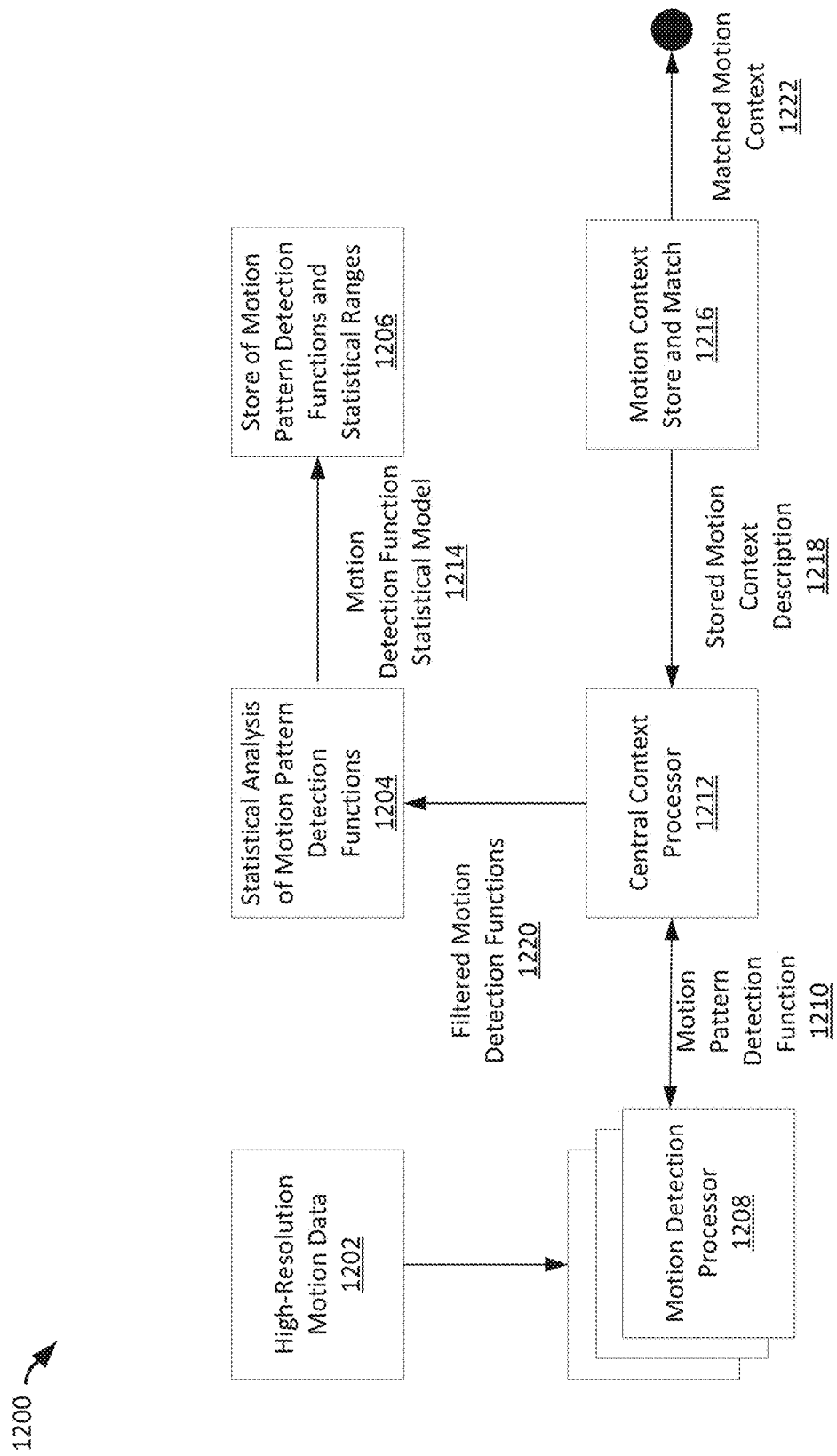
FIG. 12 is a block diagram of an example process for encoding motion in motion signatures.

FIG. 12 illustrates a block diagram of an example process 1200 for encoding motion in motion signatures and using the motion signatures to determine a motion context. At 1202, high-resolution motion data is captured by one or more motion detection processors 1208. In various implementations, high-resolution motion data includes raw real-time motion data such as, for example, channel state information. Low-resolution motion data is data that motion detection processors 1208 convert from high-resolution data to be transferred to a central context processor 1212. The low-resolution motion data could be, for example, a data set with or without a timestamp, amount of motion, location, etc. In general high-resolution motion data implies detailed data that is the basis for many possible processing options and can be further processed in many ways. Low-resolution motion data limits the information available in some way such as, for example, less points in time or less detail in the information itself and is therefore limited in further processing options.

In various implementations, the motion detection processors 1208 are wireless communication devices such as, for example, wireless access points or wireless edge devices. The high-resolution motion data may include channel state information derived from wireless signals transmitted through a space between multiple wireless communication devices. Over a training period, the high-resolution motion data is provided to a central context processor 1212, which may be a cloud-based computer system. The central context processor 1212 analyzes the high-resolution motion data and produces a plurality of motion-pattern detection functions. Each of the motion-pattern detection functions corresponds to a specific motion event that occurred in the space during the training period. In various implementations a motion event may be an occurrence or non-occurrence of a specified pattern of motion. In other implementations, the motion event may be, for example, a periodic update of historical information that is already defined in the motion pattern detection function. An example of such a periodic update is a regular stream of output from the motion pattern detector providing, for example, status of "are people moving between rooms" Which every minute provide a "no" until the point in time where the pattern is detected and then it provides a "yes" while the pattern is detected and then reverts to a "no" thereafter The motion-pattern detection function is transmitted to the motion detection processor 1208 and stored on the motion detection processor 1208. After completion of the training period, as additional motion information is received at the motion-detection processor 1208, the motion-pattern detection functions 1210 are applied to the motion data in order to detect the occurrence of the motion events. When an occurrence of a motion event is detected, a notification is sent to the cloud-based computer system. At 1212, the central context processor 1212 may receive stored motion context descriptions 1218 from a database 1216 and use the motion context descriptions to filter the motion pattern detection function 1210 into filtered motion signatures 1220 to match motion context. In various implementations, a statistical analysis of the filtered motion pattern detection functions 1220 is performed at 1204 to create a motion pattern statistical model 1214 for each motion pattern detection function. The motion pattern statistical model 1214 is stored in a store of the motion pattern detection functions and statistical ranges 1206 and made available to the database 1216. The database 1216 compares the stored statistical models and matches them to functions in the database 1216. Upon determining a match, a matched motion context 1222 is produced. In some cases, a motion pattern detection function can be generated directly on a motion detection processor and sent to the database. For example, if the motion detection processor possesses sufficient processing power to condense the high-resolution motion data into a more efficient motion pattern detection function suitable for transfer to the central context processor.

In some cases, a database can contain motion pattern detection functions and statistical ranges or trends in which a motion pattern detection function may be expected to occur in time and space. With an understanding of motion pattern detection functions and their statistical ranges or trends, real-time data in a motion detection system can be compared to these motion pattern detection functions to determine if a motion context match has occurred.

In some examples, a motion pattern detection function may record a motion pathway as a curve that represents the motion of a person first thing in the morning after a period of sleep. The curve may indicate that the person moves between, for example, a bedroom and kitchen as the first activity of the morning. In an example, a statistical range includes a spatial range corresponding to the physical dimensions of the halls and doorways. A temporal range may define a period, e.g., between 9 am and 9:30 am each day, during which the spatial component of this signature is expected to occur. In another example of a motion pattern detection function, a categorical representation of presence or location, such as a sequence of time and motion, becomes a representation of motion. In an example, this could be represented as [{Time 0, motion in bedroom}, {Time 1, motion in Kitchen}].

Figure 13:
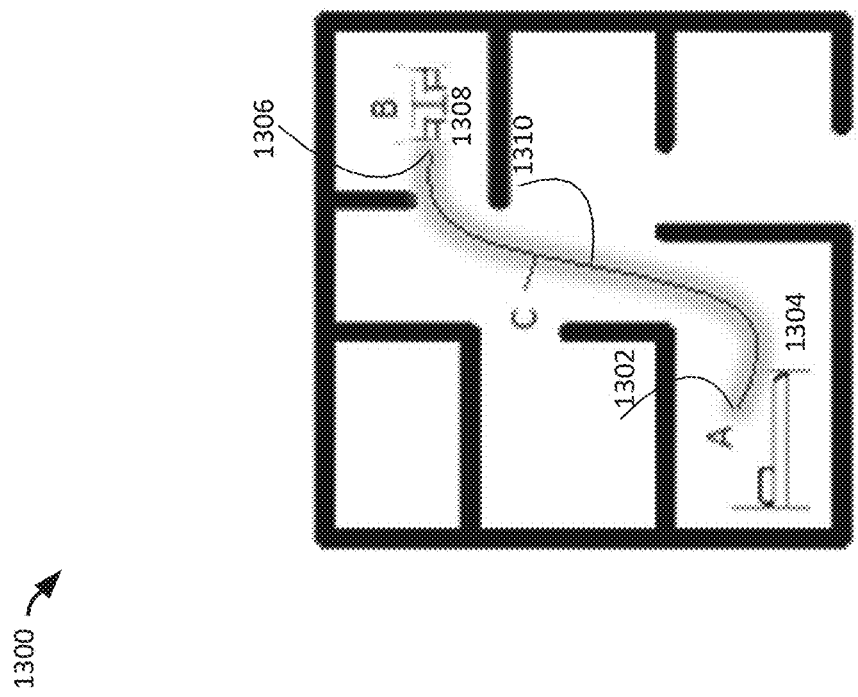
FIG. 13 is a diagram showing an example of a motion signature.

FIG. 13 illustrates an example of such a motion pattern detection function 1300. In an example, point 1302 represents a starting point, a bedroom 1304. Point 1306 represents a destination, a kitchen 1308. The path 1310, which is terminated by points 1302 and 1306, represents a route between the bedroom 1304 and the kitchen 1308, allowing for, for example, one meter of deviation along all the points of the route 1310 C. A temporal component may be attached to the motion signature. In the example shown in FIG. 13, the temporal component is 9:00 AM to 9:30 AM weekday mornings.

Motion pattern detection functions can be stored and shared between motion detection processors and a central context processor. As motion occurs, in real-time, a motion pattern detection function can be created or real-time motion data can be evaluated against the motion pattern detection function to determine if a predetermined motion event has occurred.

An evaluation of context may calculate a curve representing, for example, a pathway and real time data points. Such a calculation may, in various implementations, employ a regression model or least mean squares; however, in other implementations, other models may be used to calculate the curve. The occurrence of such a motion-pattern detection function could be used to inform a context requestor. In an example, a context requestor could be a function within a classifier system. Another method of evaluating context could be the use of a maximum likelihood detector such as a Viterbi decoder that receives a sequence of coordinates in time and space and determines the likelihood of a prior mapped pattern of motion occurring.

Figure 14:
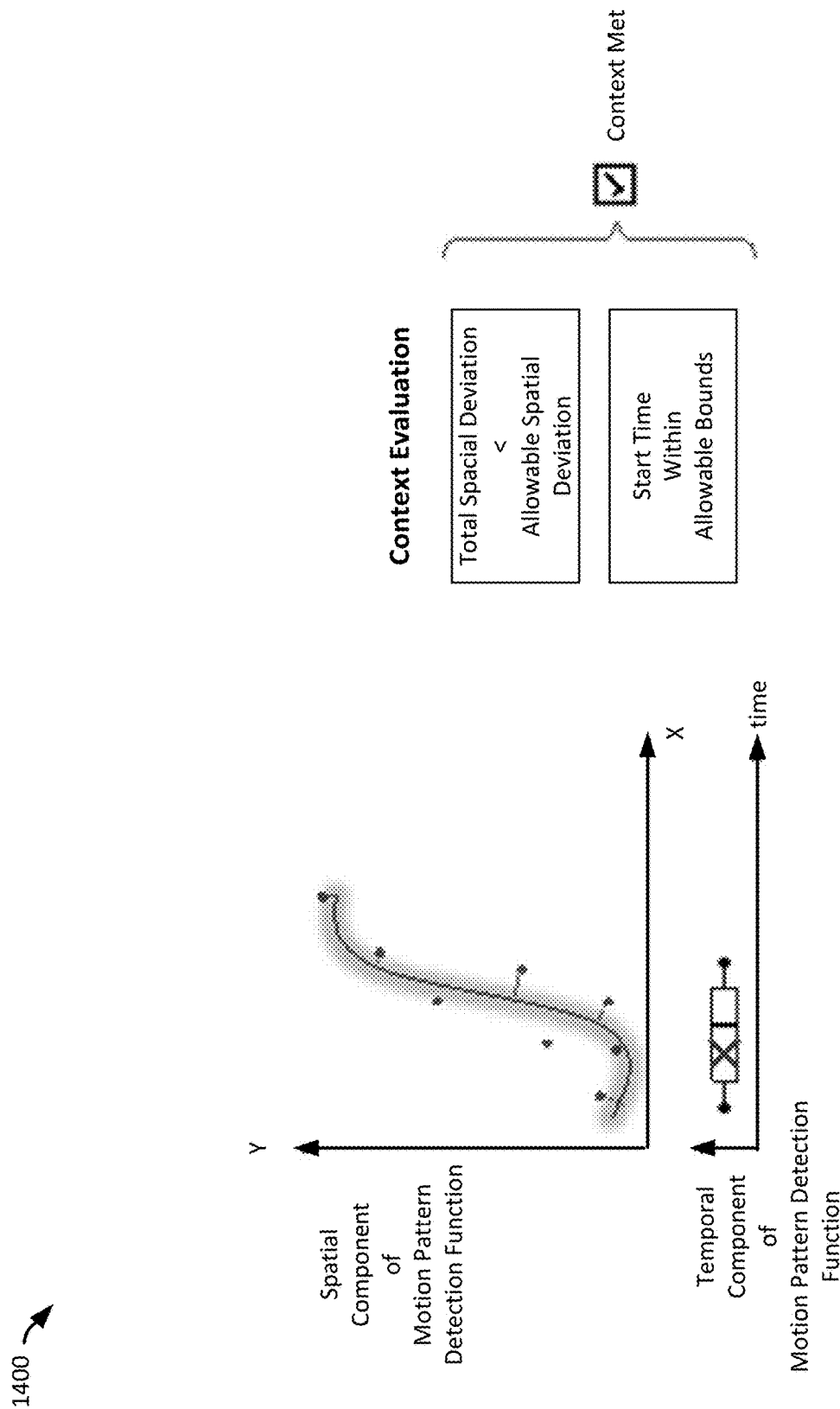
FIG. 14 is a diagram showing an example of a context evaluation of a motion event against a motion signature.

FIG. 14 shows an example 1400 of a context evaluation of a motion event against the motion pattern detection function of FIG. 13. In this example, the spatial deviation along the path from the bedroom to the kitchen is compared to an allowable spatial deviation of, for example, +/−one meter along all points of the path/curve. Similarly, the start time of the motion event is compared to the allowable bounds of the signature. In this example, the start time is between 9:00 AM to 9:30 AM on weekday mornings.

An example scenario is that of a caregiver requesting an alert if an elderly person deviates from a morning routine, e.g., by taking an atypical path from the bedroom to the washroom, by failing to get out of bed within a "normal" window of time, or both.

Figure 15:
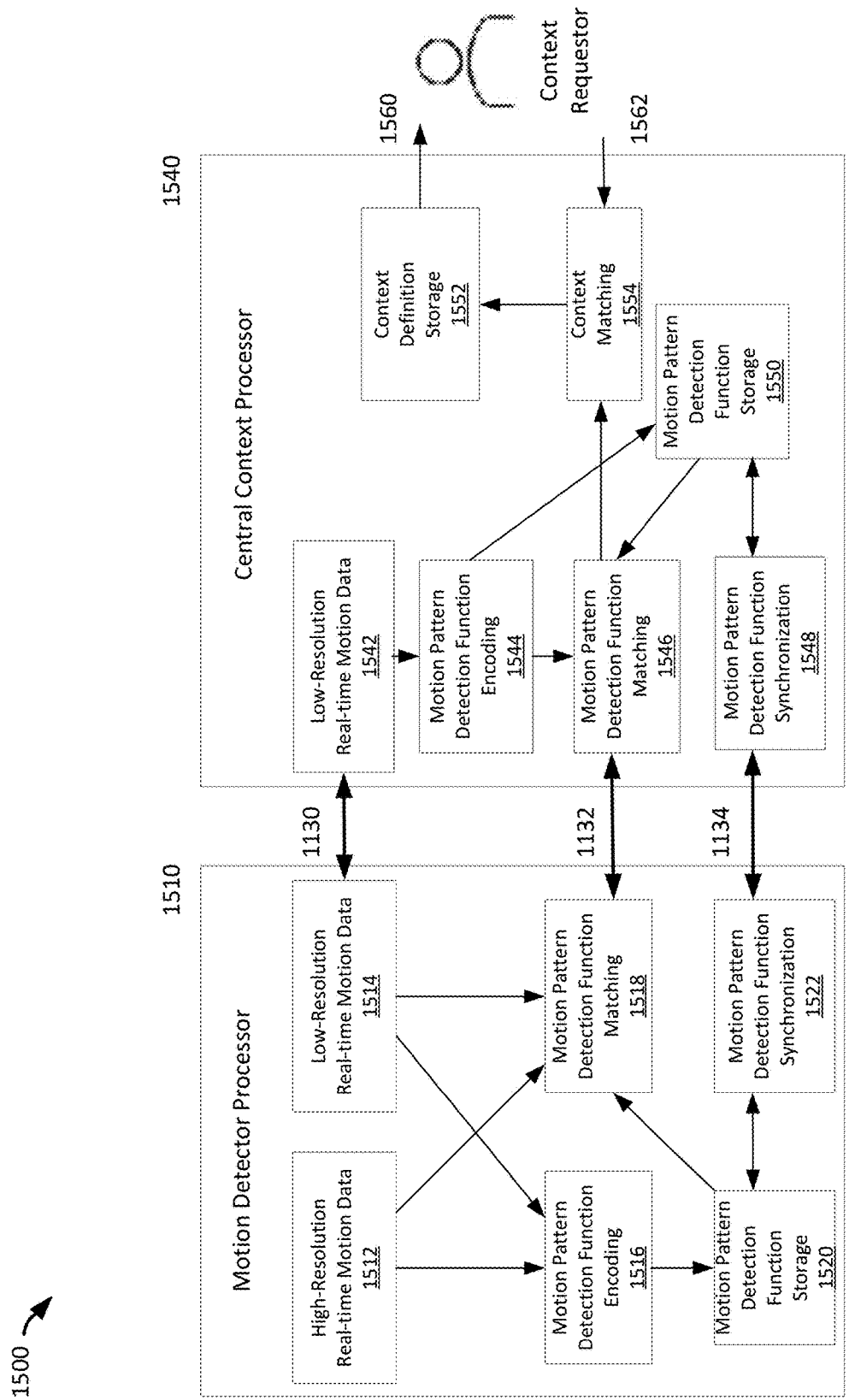
FIG. 15 is a block diagram of an example system for encoding motion information into motion signatures.

FIG. 15 shows a block diagram of an example system for encoding motion information into motion pattern detection functions for efficient storage, transmission, and computation. In an example, such as that shown by process 1500 in FIG. 15, a motion service provider, ISP, or developer of motion processing technology may seek to balance the processing and storage load between one or more motion detection processors 1510 that are limited in computing power and storage, and a central context processor 1540, with which it can be expensive to share high-resolution motion data. A motion detection processor 1510 can convert raw high-resolution real-time motion data 1512 into low-resolution data sets that can be transferred to the central context processor 1540. Either of the motion detection processor 1510 and the central context processor 1540 can compute a motion pattern detection function. Low-resolution motion data 1530 and motion pattern detection functions 1534 can then be exchanged between the motion detection processor 1510 and the central context processor 1540. Either of these processors can then perform further operations on the data and determine whether the motion data matches any one of the stored motion pattern detection functions. A match with a stored motion pattern detection function is also known as a context match. A central context processor 1540 can also act as an interface to a context requestor, in which the context requestor provides requirements 1562 for motion context of interest and receives feedback 1560 to inform whether the motion context has been met.

Figure 16:
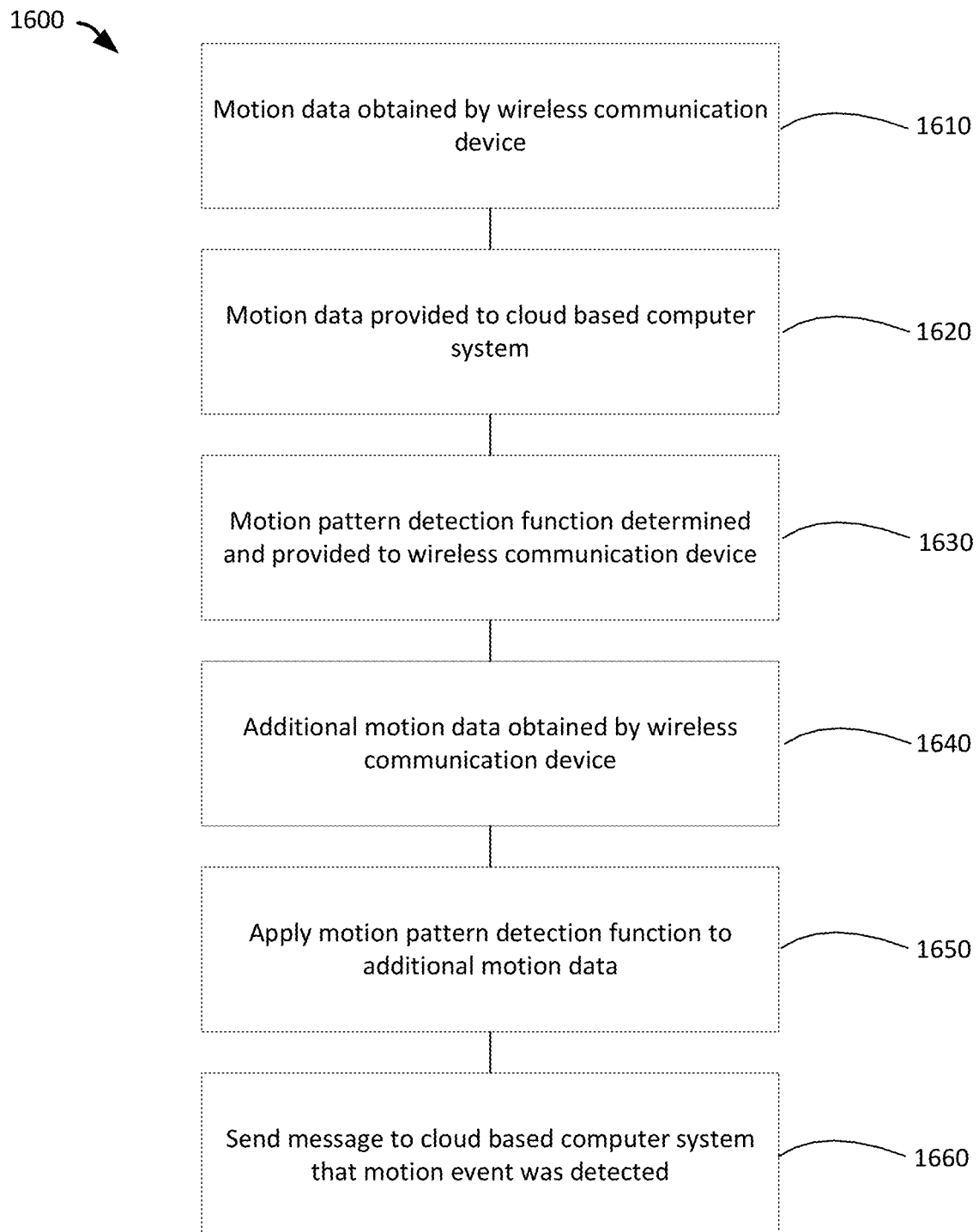
FIG. 16 is a flow diagram illustrating an example process for encoding motion.

FIG. 16 is a flow diagram illustrating a process 1600 for encoding motion data. Operations in the example process 1600 may be performed by a data processing apparatus (e.g., a processor in a central context processor 1212 illustrated in FIG. 12, or the central context processor 1540 illustrated in FIG. 15 to detect a location of motion based on signals transmitted from wireless communication devices. The example process 1600 may be performed by another type of device. For instance, operations of the process 1600 may be performed by a system other than a cloud-based computer system (e.g., a computer system connected to the wireless communication system 100 of FIG. 1A that aggregates and analyzes signals received by the wireless communication devices 102). The motion detection system can process information based on wireless signals transmitted (e.g., on wireless links between wireless communication devices) through a space to detect motion of objects in the space (e.g., as described with respect to FIGS. 1 and 2A, 2B, 2C, or otherwise).

The example process 1600 may include additional or different operations, and the operations may be performed in the order shown or in another order. In some cases, one or more of the operations shown in FIG. 16 are implemented as processes that include multiple operations, sub-processes, or other types of routines. In some cases, operations can be combined, performed in another order, performed in parallel, iterated or otherwise repeated, or performed another manner.

At 1610 motion data is obtained at a wireless communication device in a motion detection system. In various implementations, the motion data includes channel state information derived from wireless signals that are communicated through a space by wireless communication devices as illustrated in FIGS. 2A and 2B. In various implementations, the wireless communication devices could be, for example, the wireless communication devices 102A, 102B, 102C, illustrated in FIG. 1, the wireless communication devices 202A, 202B, 202C, illustrated in FIGS. 2A and 2B, the Wi-Fi device 512 illustrated in FIG. 5, the motion detection processor 1208 illustrated in FIG. 12, or the motion detection processor 1510, illustrated in FIG. 15.

At 1620, over a training period, the motion data is provided by the wireless communication device to a cloud-based computer system. In various implementations, the cloud-based computer system may be, for example, the cloud motion processor 522, illustrated in FIG. 5, the central context processor 1012 illustrated in FIG. 10 the central context processor 1212, illustrated in FIG. 12, or the central context processor 1540, illustrated in FIG. 15.

At 1630, a motion pattern detection function, which corresponds to a motion event occurring in the space during the training period, is received from the cloud based computer system. In various implementations, the motion pattern detection function may be the motion pattern detection function 1210 illustrated in FIG. 12, or the motion pattern detection function 1300, illustrated in FIG. 13.

In various implementations, the motion event includes a temporal range of motion and a spatial range of motion. The temporal range of motion may include a time stamp indicating, for example, a start time, a stop time, or an occurrence time of an event during the motion event. In various implementations, the spatial range of motion may include, for example, parameters describing a curve defining a motion path.

At 1640, after the training period, additional motion information is obtained by the wireless communication device. At 1650, the motion pattern detection function is applied to the additional motion information in order to detect an occurrence of the motion event. At 1660, a message is sent from the wireless communication device to the cloud based computer system that includes an indication that occurrence of the motion event was detected.

In various implementations, the indication may include, for example, additional information that describes the occurrence of the motion event. For example, in some implementations, the additional information may include a time that the motion event occurred or a motion path of the motion event. In various implementations, the motion path may include a location of the motion event. In other implementations, the motion path may be independent of location.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, context-dependent processing and encoding are applied to motion data from a wireless communication network. In some cases, a motion detection system provides motion context alerts and notifications. In some cases, a motion detection system performs motion encoding.

In a first example, a method includes receiving, at a cloud-based computer system, motion data from a remote motion detection system. The remote motion detection system is configured to detect motion in a space. The motion detection system includes a plurality of wireless communication devices, and the motion data is derived from wireless signals communicated through the space by the wireless communication devices. By operation of the cloud-based computer system, a motion classifier is applied to the motion data to detect an occurrence of a first predefined motion event in the space. Based on reference to a database third party entities are correlated to a plurality of predefined motion events and a subset of the third party entities that have registered for notifications associated with the first predefined motion event is identified. Notifications are generated addressed to the subset of the third party entities with each notification including an indication that the first predefined motion event was detected and including additional information describing the occurrence of the first predefined motion event. The notifications are sent to the subset of the third party entities.

Implementations of the first example may include one or more of the following features. First, the predefined motion event may be the occurrence or non-occurrence of a specified pattern of motion. Second, the predefined motion event may include a temporal range of motion and a spatial range of motion. Third, application of the motion classifier to the motion data may include applying a curve-fitting algorithm, a clustering algorithm, or a neural network to the motion data. The occurrence of the first predefined motion event is detected based on the output of the curve-fitting algorithm, the clustering algorithm, or the neural network.

Implementations of the first example may further include one or more of the following features. First, the additional information may include a time that the predefined motion event occurred. Second, the additional motion information may include a motion path.

Implementations of the first example may also include receiving an authorization of an end user of the motion detection system to register the subset of the third party entities for notifications associated with the first predefined motion event. Based on the authorization, the subset of third party entities is registered for notifications associated with the first predefined motion event. In some implementations, the correlation of the first predefined motion event and the subset of third party entities are stored in a database.

In an implementation of the first example, the motion classifier is a first motion classifier and the subset is a first subset. The method of the first example further includes by operation of the cloud-based computer system, applying a second motion classifier to the motion data to detect an occurrence of a second predefined motion event in the space. Based on reference to the database, a second subset of the third party entities that have registered for notifications associated with the second predefined motion event is identified. Notifications are generated addressed to the second subset of the third party entities, each notification comprising an indication that the second predefined motion event was detected and additional information describing the occurrence of the second predefined motion event. The notifications are sent to the second subset of the third party entities.

In a second example, a non-transitory computer-readable medium includes instructions that are operable, when executed by a data processing apparatus, to perform operations that include receiving, at a cloud-based computer system, motion data from a remote motion detection system. The remote motion detection system is configured to detect motion in a space. The motion detection system includes a plurality of wireless communication devices, and the motion data is derived from wireless signals communicated through the space by the wireless communication devices. By operation of the cloud-based computer system, a motion classifier is applied to the motion data to detect an occurrence of a first predefined motion event in the space. Based on reference to a database third party entities are correlated to a plurality of predefined motion events and a subset of the third party entities that have registered for notifications associated with the first predefined motion event is identified. Notifications are generated addressed to the subset of the third party entities with each notification including an indication that the first predefined motion event was detected and including additional information describing the occurrence of the first predefined motion event. The notifications are sent to the subset of the third party entities.

Implementations of the second example may include one or more of the following features. First, the predefined motion event may be the occurrence or non-occurrence of a specified pattern of motion. Second, the predefined motion event may include a temporal range of motion and a spatial range of motion. Third, application of the motion classifier to the motion data may include applying a curve-fitting algorithm, a clustering algorithm, or a neural network to the motion data. The occurrence of the first predefined motion event is detected based on the output of the curve-fitting algorithm, the clustering algorithm, or the neural network.

Implementations of the second example may further include one or more of the following features. First, the additional information may include a time that the predefined motion event occurred. Second, the additional motion information may include a motion path.

Implementations of the second example may also include receiving an authorization of an end user of the motion detection system to register the subset of the third party entities for notifications associated with the first predefined motion event. Based on the authorization, the subset of third party entities is registered for notifications associated with the first predefined motion event. In some implementations, the correlation of the first predefined motion event and the subset of third party entities are stored in a database.

In an implementation of the second example, the motion classifier is a first motion classifier and the subset is a first subset. The method of the first example further includes by operation of the cloud-based computer system, applying a second motion classifier to the motion data to detect an occurrence of a second predefined motion event in the space. Based on reference to the database, a second subset of the third party entities that have registered for notifications associated with the second predefined motion event is identified. Notifications are generated addressed to the second subset of the third party entities, each notification comprising an indication that the second predefined motion event was detected and additional information describing the occurrence of the second predefined motion event. The notifications are sent to the second subset of the third party entities.

In a third example, a system includes a plurality of wireless communication devices in a wireless communication network and a computer device having one or more processors that are operable to perform operations that include receiving, at a cloud-based computer system, motion data from a remote motion detection system. The remote motion detection system is configured to detect motion in a space. The motion detection system includes a plurality of wireless communication devices, and the motion data is derived from wireless signals communicated through the space by the wireless communication devices. By operation of the cloud-based computer system, a motion classifier is applied to the motion data to detect an occurrence of a first predefined motion event in the space. Based on reference to a database third party entities are correlated to a plurality of predefined motion events and a subset of the third party entities that have registered for notifications associated with the first predefined motion event is identified. Notifications are generated addressed to the subset of the third party entities with each notification including an indication that the first predefined motion event was detected and including additional information describing the occurrence of the first predefined motion event. The notifications are sent to the subset of the third party entities.

Implementations of the third example may include one or more of the following features. First, the predefined motion event may be the occurrence or non-occurrence of a specified pattern of motion. Second, the predefined motion event may include a temporal range of motion and a spatial range of motion. Third, application of the motion classifier to the motion data may include applying a curve-fitting algorithm, a clustering algorithm, or a neural network to the motion data. The occurrence of the first predefined motion event is detected based on the output of the curve-fitting algorithm, the clustering algorithm, or the neural network.

Implementations of the third example may further include one or more of the following features. First, the additional information may include a time that the predefined motion event occurred. Second, the additional motion information may include a motion path.

Implementations of the third example may also include receiving an authorization of an end user of the motion detection system to register the subset of the third party entities for notifications associated with the first predefined motion event. Based on the authorization, the subset of third party entities is registered for notifications associated with the first predefined motion event. In some implementations, the correlation of the first predefined motion event and the subset of third party entities are stored in a database.

In an implementation of the third example, the motion classifier is a first motion classifier and the subset is a first subset. The method of the first example further includes by operation of the cloud-based computer system, applying a second motion classifier to the motion data to detect an occurrence of a second predefined motion event in the space. Based on reference to the database, a second subset of the third party entities that have registered for notifications associated with the second predefined motion event is identified. Notifications are generated addressed to the second subset of the third party entities, each notification comprising an indication that the second predefined motion event was detected and additional information describing the occurrence of the second predefined motion event. The notifications are sent to the second subset of the third party entities.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
   receiving, at a cloud-based computer system, motion data from a remote motion detection system configured to detect motion in a space, the motion detection system comprising a plurality of wireless communication devices, the motion data derived from wireless signals communicated through the space by the wireless communication devices, the motion data indicating a detected path of motion in the space;
   by operation of the cloud-based computer system, applying a motion classifier to the motion data to detect an occurrence or non-occurrence of a first predefined motion event in the space, wherein the first predefined motion event represents a first pathway through the space, detecting the occurrence or non-occurrence of the first predefined motion event comprises comparing the detected path of motion with an allowable spatial deviation from the first pathway, and the detected path of motion being outside the allowable spatial deviation indicates non-occurrence of the first predefined motion event;
   based on reference to a database correlating third party entities to a plurality of predefined motion events, identifying a subset of the third party entities that have registered for notifications associated with the first predefined motion event;
   generating notifications addressed to the subset of the third party entities, each notification comprising an indication that the occurrence or non-occurrence of the first predefined motion event was detected and additional information describing the occurrence or non-occurrence of the of the first predefined motion event, wherein the additional information comprises the detected path of motion; and
   sending the notifications to the subset of the third party entities.

2. The method of claim 1, wherein the first predefined motion event comprises a temporal range of motion and a spatial range of motion associated with the first pathway.

3. The method of claim 1, wherein the additional information comprises a time that the first predefined motion event occurred.

4. The method of claim 1, comprising, prior to receiving the motion data:
   receiving an authorization of an end user of the remote motion detection system to register the subset of the third party entities for notifications associated with the first predefined motion event; and
   based on the authorization, registering the subset of third party entities for notifications associated with the first predefined motion event.

5. The method of claim 4, wherein registering the subset of third party entities comprises storing a correlation of the first predefined motion event and the subset of third party entities in the database.

6. The method of claim 1, wherein applying the motion classifier to the motion data comprises applying a curve-fitting algorithm to the motion data, and the occurrence or non-occurrence of the first predefined motion event is detected based on an output of the curve-fitting algorithm.

7. The method of claim 1, wherein applying the motion classifier to the motion data comprises applying a clustering algorithm to the motion data, and the occurrence or non-occurrence of the first predefined motion event is detected based on an output of the clustering algorithm.

8. The method of claim 1, wherein applying the motion classifier to the motion data comprises applying a neural network to the motion data, and the occurrence or non-occurrence of the first predefined motion event is detected based on an output of the neural network.

9. The method of claim 1, wherein the motion classifier is a first motion classifier, the subset is a first subset, and the method comprises:
   by operation of the cloud-based computer system, applying a second motion classifier to the motion data to detect an occurrence or non-occurrence of a second predefined motion event in the space;
   based on reference to the database, identifying a second subset of the third party entities that have registered for notifications associated with the second predefined motion event;
   generating notifications addressed to the second subset of the third party entities, each notification comprising an indication that the second predefined motion event was detected and additional information describing the occurrence or non-occurrence of the second predefined motion event; and
   sending the notifications to the second subset of the third party entities.

10. A non-transitory computer-readable medium comprising instructions that are operable, when executed by a data processing apparatus, to perform operations comprising:
    receiving, at a cloud-based computer system, motion data from a remote motion detection system configured to detect motion in a space, the remote motion detection system comprising a plurality of wireless communication devices, the motion data derived from wireless signals communicated through the space by the wireless communication devices, the motion data indicating a detected path of motion in the space;
    by operation of the cloud-based computer system, applying a motion classifier to the motion data to detect an occurrence or non-occurrence of a first predefined motion event in the space, wherein the first predefined motion event represents a first pathway through the space, detecting the occurrence or non-occurrence of the first predefined motion event comprises comparing the detected path of motion with an allowable spatial deviation from the first pathway, and the detected path of motion being outside the allowable spatial deviation indicates non-occurrence of the first predefined motion event;

based on reference to a database correlating third party entities to a plurality of predefined motion events, identifying a subset of the third party entities that have registered for notifications associated with the first predefined motion event;

generating notifications addressed to the subset of the third party entities, each notification comprising an indication that the occurrence or non-occurrence of the first predefined motion event was detected and additional information describing the occurrence or non-occurrence of the first predefined motion event, wherein the additional information comprises the detected path of motion; and sending the notifications to the subset of the third party entities.

11. The computer-readable medium of claim 10, wherein the predefined motion event comprises a temporal range of motion and a spatial range of motion associated with the pathway.

12. The computer-readable medium of claim 10, wherein the additional information comprises a time that the predefined motion event occurred.

13. The computer-readable medium of claim 10, comprising, prior to receiving the motion data:

receiving an authorization of an end user of the motion detection system to register the subset of the third party entities for notifications associated with the first predefined motion event; and based on the authorization, registering the subset of third party entities for notifications associated with the first predefined motion event.

14. The computer-readable medium of claim 13, wherein registering the subset of third party entities comprises storing a correlation of the first predefined motion event and the subset of third party entities in the database.

15. The computer-readable medium of claim 10, wherein applying the motion classifier to the motion data comprises applying a curve-fitting algorithm to the motion data, and the occurrence or non-occurrence of the first predefined motion event is detected based on an output of the curve-fitting algorithm.

16. The computer-readable medium of claim 10, wherein applying the motion classifier to the motion data comprises applying a clustering algorithm to the motion data, and the occurrence or non-occurrence of the first predefined motion event is detected based on an output of the clustering algorithm.

17. The computer-readable medium of claim 10, wherein applying the motion classifier to the motion data comprises applying a neural network to the motion data, and the occurrence or non-occurrence of the first predefined motion event is detected based on an output of the neural network.

18. The computer-readable medium of claim 10, wherein the motion classifier is a first motion classifier, the subset is a first subset, and the operations comprises:

by operation of the cloud-based computer system, applying a second motion classifier to the motion data to detect an occurrence or non-occurrence of a second predefined motion event in the space;

based on reference to the database, identifying a second subset of the third party entities that have registered for notifications associated with the second predefined motion event;

generating notifications addressed to the second subset of the third party entities, each notification comprising an indication that the second predefined motion event was detected and additional information describing the occurrence or non-occurrence of the second predefined motion event; and sending the notifications to the second subset of the third party entities.

19. A system comprising:

a plurality of wireless communication devices in a wireless communication network; and a computer device comprising one or more processors operable to perform operations comprising:

receiving motion data from a remote motion detection system configured to detect motion in a space, the motion detection system comprising a plurality of wireless communication devices, the motion data derived from wireless signals communicated through the space by the wireless communication devices, the motion data indicating a detected path of motion in the space;

applying a motion classifier to the motion data to detect an occurrence or non-occurrence of a first predefined motion event in the space, wherein the first predefined motion event represents a first pathway through the space, detecting the occurrence or non-occurrence of the first predefined motion event comprises comparing the detected path of motion with an allowable spatial deviation from the first pathway, and the detected path of motion being outside the allowable spatial deviation indicates non-occurrence of the first predefined motion event;

based on reference to a database correlating third party entities to a plurality of predefined motion events, identifying a subset of the third party entities that have registered for notifications associated with the first predefined motion event;

generating notifications addressed to the subset of the third party entities, each notification comprising an indication that the occurrence or non-occurrence of the first predefined motion event was detected and additional information describing the occurrence or non-occurrence of the first predefined motion event, wherein the additional information comprises the detected path of motion; and sending the notifications to the subset of the third party entities.

20. The system of claim 19, wherein the predefined motion event comprises a temporal range of motion and a spatial range of motion associated with the pathway.

21. The system of claim 19, wherein the additional information comprises a time that the predefined motion event occurred.

22. The system of claim 19, comprising, prior to receiving the motion data:

receiving an authorization of an end user of the motion detection system to register the subset of the third party entities for notifications associated with the first predefined motion event; and based on the authorization, registering the subset of third party entities for notifications associated with the first predefined motion event.

23. The system of claim 22, wherein registering the subset of third party entities comprises storing a correlation of the first predefined motion event and the subset of third party entities in the database.

24. The system of claim 19, wherein applying the motion classifier to the motion data comprises applying a curve-fitting algorithm to the motion data, and the occurrence or non-occurrence of the first predefined motion event is detected based on an output of the curve-fitting algorithm.

25. The system of claim 19, wherein applying the motion classifier to the motion data comprises applying a clustering algorithm to the motion data, and the occurrence or non-occurrence of the first predefined motion event is detected based on an output of the clustering algorithm.

26. The system of claim 19, wherein applying the motion classifier to the motion data comprises applying a neural network to the motion data, and the occurrence or non-occurrence of the first predefined motion event is detected based on an output of the neural network.

27. The system of claim 19, wherein the motion classifier is a first motion classifier, the subset is a first subset, and the operations comprise:
   applying a second motion classifier to the motion data to detect an occurrence or non-occurrence of a second predefined motion event in the space;
   based on reference to the database, identifying a second subset of the third party entities that have registered for notifications associated with the second predefined motion event;
   generating notifications addressed to the second subset of the third party entities, each notification comprising an indication that the second predefined motion event was detected and additional information describing the occurrence or non-occurrence of the second predefined motion event; and
   sending the notifications to the second subset of the third party entities.

* * * * *

UNITED STATES PATENT AND TRADEMARK OFFICE
CERTIFICATE OF CORRECTION

PATENT NO. : 12,069,543 B2
APPLICATION NO. : 18/059290
DATED : August 20, 2024
INVENTOR(S) : Toner et al.

Page 1 of 1

It is certified that error appears in the above-identified patent and that said Letters Patent is hereby corrected as shown below:

In the Specification

Column 12, Line 2 Delete "on" and insert -- $\omega_n$ --

Signed and Sealed this
Twenty-ninth Day of October, 2024

Katherine Kelly Vidal
*Director of the United States Patent and Trademark Office*